United States Patent
Noma et al.

(10) Patent No.: US 6,671,138 B2
(45) Date of Patent: Dec. 30, 2003

(54) MULTI-LAYER MAGNETORESISTIVE HEAD AND INFORMATION-REPRODUCING SYSTEM

(75) Inventors: Kenji Noma, Kawasaki (JP); Hitoshi Kanai, Kawasaki (JP); Kenichi Aoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 10/033,602

(22) Filed: Dec. 27, 2001

(65) Prior Publication Data

US 2002/0044399 A1 Apr. 18, 2002

Related U.S. Application Data

(63) Continuation of application No. PCT/JP99/05331, filed on Sep. 29, 1999.

(51) Int. Cl.[7] ................................................ G11B 5/39
(52) U.S. Cl. ........................... 360/324.12; 360/324.11
(58) Field of Search ........................ 360/324.11, 324.12

(56) References Cited

U.S. PATENT DOCUMENTS

| | | | |
|---|---|---|---|
| 5,408,377 A | * | 4/1995 | Gurney et al. |
| 5,898,549 A | * | 4/1999 | Gill |
| 6,327,122 B1 | * | 12/2001 | Pinarbasi ............... 360/324.11 |
| 6,356,419 B1 | * | 3/2002 | Gill ........................ 360/324.11 |
| 2001/0004307 A1 | * | 6/2001 | Saito et al. ............. 360/324.12 |

FOREIGN PATENT DOCUMENTS

| | | |
|---|---|---|
| JP | 07-169026 | 7/1995 |
| JP | 08-007235 | 1/1996 |
| JP | 09-016920 | 1/1997 |
| JP | 11-007614 | 1/1999 |
| JP | 11-168250 | 6/1999 |

* cited by examiner

Primary Examiner—Craig A. Renner
(74) Attorney, Agent, or Firm—Greer, Burns & Crain, Ltd.

(57) ABSTRACT

An object of the present invention is to provide a magnetoresistive effect type of head that is high in the magnetoresistive rate while including the laminated ferrimagnetic film. The fixed magnetic layer of the magnetoresistive effect type of head has a first fixed magnetic layer, a second fixed magnetic layer laminated at a position farther from the free magnetic layer as compared with the first fixed magnetic layer, and an opposite-parallel-coupling intermediate layer interposed between the first fixed magnetic layer and the second fixed magnetic layer, in which magnetizations of the first and second fixed magnetic layers are coupled with one another in such a manner that the magnetizations are pointed in directions which are substantially parallel and mutually opposite. The second fixed magnetic layer is formed with a material that is different from a material of said first fixed magnetic layer, and has a resistivity higher than that of said first fixed magnetic layer.

3 Claims, 10 Drawing Sheets

MULTI-LAYER MAGNETORESISTIVE HEAD AND INFORMATION-REPRODUCING SYSTEM

This is a continuation of International PCT Application No. JP99/05331 filed Sep. 29, 1999, which was not published in English.

TECHNICAL FIELD

The present invention relates to a magnetoresistive effect type of head for detecting intensity of a magnetic field utilizing a resistive change according to the intensity of the magnetic field, and an information-reproducing system for reproducing information stored in a storage medium.

BACKGROUND ART

As computers have come into wide use, a lot of information is dealt routinely recently. Such information is stored in a storage medium with a large number of physical marks, and is reproduced by an information-reproducing system for reading those marks to produce an electric reproduction signal.

A hard disk device (HDD: Hard Disk Drive) is one of such an information-reproducing system and has aspects that it has a large storage capacity and an access time to information is fast. Generally, such a HDD is provided with a magnetic disk of which a surface is a recording medium made of a magnetic material and a reproducing head for reproducing information stored in the magnetic disk. The magnetic disk is magnetized in its surface for each minute area (one-bit area) in which one-bit of information is recorded in the form of a direction of magnetization of the one-bit area. The reproducing head is disposed close to the magnetic disk to output an electric reproduction signal according to a magnetic field generated from the one-bit area of the magnetic disk and thereby reproducing information recorded on the magnetic disk.

Currently, in many of the reproducing heads, which are loaded on the HDD, a signal is sent through a magnetoresistive effect type of head (MR head) which has a magnetoresistive effect element varying a resistance in accordance with an external magnetic field. The magnetoresistive effect element is utilized to generate a high output reproduction signal. However, every year a recording density of a magnetic disk is enhanced, and as the recording density is enhanced, a size of the respective one-bit area of the magnetic disk is reduced, and a magnetic field generated from the magnetization of the one-bit area is weakened. Thus, there is needed a head which outputs a large reproduction signal to such a weakened external magnetic field. As a head that outputs such a large reproduction signal, there is known a spin valve magnetoresistive head (SVMR head). Making the spin valve magnetoresistive head fit for practical use starts in earnest. Hereinafter, the spin valve magnetoresistive head is referred to as an SVMR head.

The SVMR head has a spin valve element consisting of a multi-layer film including a free magnetic layer varying in a direction of magnetization in accordance with an external magnetic field, a non-magnetic metal layer, a fixed magnetic layer fixed in a direction of magnetization, and an antiferromagnetic layer for fixing a direction of magnetization of the fixed magnetic layer. A sensing current conducts through the spin valve element. The spin valve element is one of the above-mentioned magnetoresistive effect elements. In the spin valve element, when the external magnetic field is varied, the free magnetic layer of the spin valve element is varied in a direction of magnetization, and a resistance is varied in accordance with a relative angle variation between a direction of magnetization of the fixed magnetic layer and a direction of magnetization of the free magnetic layer. Generally, efficiency of the resistive change of the magnetoresistive effect element according to the variation of the external magnetic field is expressed by a magnetoresistive rate $R_{MR}$. The magnetoresistive rate $R_{MR}$ is defined by $R_{MR}=(\rho_{max}-\rho_0)/\rho_0$. $\rho_0$ denotes a rate of the magnetoresistive effect element wherein the external magnetic field is not applied. $\rho_{max}$ denotes the maximum rate of the magnetoresistive effect element wherein the external magnetic field is applied. The spin valve element is large in the magnetoresistive rate, which brings about a large output change through the above-mentioned sensing current. Incidentally, hereinafter, the magnetoresistive rate is referred as MR rate.

As one way of providing higher output of the SVMR head, there is considered a reduction of the height of an element of the spin valve element. Reducing the height of an element of the spin valve element causes a sectional area of a conduction path for the sensing current to be reduced so that the resistive change $\rho_{max}\rho_0$ becomes large, while the MR rate is not increased. Thus, it is possible to obtain a large output of reproduction signal. However, a direction of magnetization of the fixed magnetic layer points to a direction of height of the spin valve element. Accordingly, a simple reduction of height of the spin valve element causes a demagnetizing field of the fixed magnetic layer to be enhanced so that fixing of the magnetization of the fixed magnetic layer is weakened, and as a result the direction of the magnetization is inclined with a discrepancy from the above-mentioned predetermined direction. This is associated with a problem that a waveform of the reproduction signal is distorted.

In order to weaken an influence of the demagnetizing field, there is known a spin valve element in which a fixed magnetic layer is constituted of a laminated ferrimagnetic film taking a three-layer structure of a first fixed magnetic layer indicative of ferromagnetism, a second fixed magnetic layer indicative of ferromagnetism and an opposite-parallel-coupling intermediate layer interposed between those first and second fixed magnetic layers, in which magnetizations of those fixed magnetic layers are coupled with each other in such a manner that those magnetizations are pointed in directions which are substantially parallel and mutually opposite. According to such a laminated ferrimagnetic film, the magnetizations of the first and second fixed magnetic layers come close to one another pointing in the opposite direction and running parallel. Thus, those magnetizations are kept being strongly fixed even if height in the element is reduced, so that a direction of the magnetization is stably maintained. In this manner, according to the SVMR head in which the laminated ferrimagnetic film is adopted in the fixed magnetic layer, it is possible to contribute to providing a higher output through reducing height in the element as mentioned above, while magnetization of the fixed magnetic layer is strongly fixed.

Further, there is known, other than the spin valve element in which the fixed magnetic layer is provided in form of the laminated ferrimagnetic film as mentioned above, a spin valve element in which a free magnetic layer is provided in form of a laminated ferrimagnetic film consisting of a first free magnetic layer, an opposite-parallel-coupling intermediate layer and a second free magnetic layer.

However, according to the SVMR head wherein the laminated ferrimagnetic layer is adopted for the free magnetic layer and the fixed magnetic layer, the laminated ferrimagnetic layer has, as mentioned above, two pieces of magnetization mutually pointed to the opposite directions, and a relative angle defined by a direction of magnetization of the free magnetic layer and a direction of magnetization of the fixed magnetic layer simultaneously takes two sorts of angle, for example, 0° and 180°. For this reason, magnetoresistive effects for the two sorts of angle are mixed. This is associated with such a defect that it is easy that the MR rate is lowered.

DISCLOSURE OF THE INVENTION

In view of the foregoing, it is an object of the present invention to provide a magnetoresistive effect type of head that is high in the magnetoresistive rate (MR rate) while including the laminated ferrimagnetic film.

To achieve the above-mentioned object, the present invention provides a first magnetoresistive effect type of head having a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said free magnetic layer has a first free magnetic layer, a second free magnetic layer laminated at a position farther from the fixed magnetic layer as compared with the first free magnetic layer, and an opposite-parallel-coupling intermediate layer interposed between the first free magnetic layer and the second free magnetic layer, in which magnetizations of the first and second free magnetic layers are coupled with one another in such a manner that the magnetizations are pointed in directions which are substantially parallel and mutually opposite, and said second free magnetic layer is formed with a material which is different from a material of said first free magnetic layer, and with a material in which an electron in said first free magnetic layer is subjected to an elastic scattering within said second free magnetic layer, within said opposite-parallel-coupling intermediate layer, and/or at the interface between said second free magnetic layer and said the opposite-parallel-coupling intermediate layer, said elastic scattering occurring at higher rate as compared with a case where said second free magnetic layer is formed with a material which is same as said first free magnetic layer.

In this manner, in the event that the second free magnetic layer is formed with a material wherein an electron is easy to be subjected to elastic scattering, the electron is hard to enter the second free magnetic layer, so that a magnetoresistive effect occurs mostly by a spin-dependent scattering of electrons in the first free magnetic layer and the fixed magnetic layer. Thus, as will be described latter in the preferred embodiment, MR rate of the magnetoresistive effect element is enhanced, and it is possible to obtain a magnetoresistive effect type of head capable of providing a higher output.

To achieve the above-mentioned object, the present invention provides a second magnetoresistive effect type of head having a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said free magnetic layer has a first free magnetic layer, a second free magnetic layer laminated at a position farther from the fixed magnetic layer as compared with the first free magnetic layer, and an opposite-parallel-coupling intermediate layer interposed between the first free magnetic layer and the second free magnetic layer, in which magnetizations of the first and second free magnetic layers are coupled with one another in such a manner that the magnetizations are pointed in directions which are substantially parallel and mutually opposite, and said second free magnetic layer is formed with a material which is different from a material of said first free magnetic layer, and has a resistivity higher than that of said first free magnetic layer.

In this manner, in the event that the second free magnetic layer has a resistivity higher than that of the first free magnetic layer, the electron is hard to enter the second free magnetic layer, so that a magnetoresistive effect occurs mostly by a spin-dependent scattering of electrons in the first free magnetic layer and the fixed magnetic layer. Thus, as will be described later in the preferred embodiment, MR rate of the magnetoresistive effect element is enhanced, and it is possible to obtain a magnetoresistive effect type of head capable of providing a higher output.

In the above-mentioned second magnetoresistive effect type of head, it is preferable that second free magnetic layer has a resistivity not less than 200 $\mu\Omega$ cm.

As the resistivity of the first free magnetic layer and the opposite-parallel-coupling intermediate layer, similar to the resistivity of the free magnetic layer of the general magnetoresistive effect type of head, 50 $\mu\Omega$ cm or less is assumed. Electrons are particularly hard to enter the second free magnetic layer having the resistivity not less than 200 $\mu\Omega$ cm, which is higher as compared with this resistivity, that is, the resistivity of the free magnetic layer of the general magnetoresistive effect type of head, 50 $\mu\Omega$ cm or less.

To achieve the above-mentioned object, the present invention provides a third magnetoresistive effect type of head having a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said fixed magnetic layer has a first fixed magnetic layer, a second fixed magnetic layer laminated at a position farther from the free magnetic layer as compared with the first fixed magnetic layer, and an opposite-parallel-coupling intermediate layer interposed between the first fixed magnetic layer and the second fixed magnetic layer, in which magnetizations of the first and second fixed magnetic layers are coupled with one another in such a manner that the magnetizations are pointed in directions which are substantially parallel and mutually opposite, and said second free magnetic layer is formed with a material which is different from a material of said first fixed magnetic layer, and with a material in which an electron in said first fixed magnetic layer is subjected to an elastic scattering within said second fixed magnetic layer, within said opposite-parallel-coupling intermediate layer, and/or at the interface between said second fixed magnetic layer and said the opposite-parallel-coupling intermediate layer, said elastic scattering occurring at higher rate as compared with a case where said second fixed magnetic layer is formed with a material which is same as said first fixed magnetic layer.

In this manner, in the event that the second fixed magnetic layer is formed with a material wherein an electron is easy to be subjected to elastic scattering, the electron is hard to enter the second fixed magnetic layer, so that a magnetoresistive effect occurs mostly by a spin-dependent scattering of electrons in the first fixed magnetic layer and the free magnetic layer. Thus, as will be described latter in the preferred embodiment, MR rate of the magnetoresistive effect element is enhanced, and it is possible to obtain a magnetoresistive effect type of head capable of providing a higher output.

To achieve the above-mentioned object, the present invention provides a fourth magnetoresistive effect type of head having a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said fixed magnetic layer has a first fixed magnetic layer, a second fixed magnetic layer laminated at a position farther from the free magnetic layer as compared with the first fixed magnetic layer, and an opposite-parallel-coupling intermediate layer interposed between the first fixed magnetic layer and the second fixed magnetic layer, in which magnetizations of the first and second fixed magnetic layers are coupled with one another in such a manner that the magnetizations are pointed in directions which are substantially parallel and mutually opposite, and said second fixed magnetic layer is formed with a material which is different from a material of said first fixed magnetic layer, and has a resistivity higher than that of said first fixed magnetic layer.

In this manner, in the event that the second fixed magnetic layer has a resistivity higher than that of the first fixed magnetic layer, the electron is hard to enter the second fixed magnetic layer, so that a magnetoresistive effect occurs mostly by a spin-dependent scattering of electrons in the first fixed magnetic layer and the free magnetic layer. Thus, as will be described latter in the preferred embodiment, MR rate of the magnetoresistive effect element is enhanced, and it is possible to obtain a magnetoresistive effect type of head capable of providing a higher output.

In the above-mentioned fourth magnetoresistive effect type of head, it is preferable that second fixed magnetic layer has a resistivity not less than 200 $\mu\Omega$ cm.

As the resistivity of the first fixed magnetic layer and the opposite-parallel-coupling intermediate layer, similar to the resistivity of the free magnetic layer of the general magnetoresistive effect type of head, 50 $\mu\Omega$ cm or less is assumed. Electrons are particularly hard to enter the second fixed magnetic layer having the resistivity not less than 200 $\mu\Omega$ cm, which is higher as compared with this resistivity, that is, the resistivity of the free magnetic layer of the general magnetoresistive effect type of head, 50 $\mu\Omega$ cm or less.

To achieve the above-mentioned object, the present invention provides a fourth magnetoresistive effect type of head having a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said fixed magnetic layer has a hard magnetic layer laminated at a position farther from the free magnetic layer as compared with the fixed magnetic layer, and an opposite-parallel-coupling intermediate layer interposed between the fixed magnetic layer and the hard magnetic layer, in which magnetization of the fixed magnetic layer and magnetization of the hard magnetic layer are coupled with one another in such a manner that the magnetizations are pointed in directions which are substantially parallel and mutually opposite, and said hard magnetic layer has a resistivity higher than that of said fixed magnetic layer.

In this manner, in the event that the hard magnetic layer has a resistivity higher than that of the fixed magnetic layer, the electron is hard to enter the hard magnetic layer, so that a magnetoresistive effect occurs mostly by a spin-dependent scattering of electrons in the free magnetic layer and the fixed magnetic layer. Thus, as will be described latter in the preferred embodiment, MR rate of the magnetoresistive effect element is enhanced, and it is possible to obtain a magnetoresistive effect type of head capable of providing a higher output.

In the above-mentioned fifth magnetoresistive effect type of head, it is preferable that second fixed magnetic layer has a resistivity not less than 200 $\mu\Omega$ cm.

As the resistivity of the first fixed magnetic layer and the opposite-parallel-coupling intermediate layer, similar to the resistivity of the fixed magnetic layer of the general magnetoresistive effect type of head, 50 $\mu\Omega$ cm or less is assumed. Electrons are particularly hard to enter the hard magnetic layer having the resistivity not less than 200 $\mu\Omega$ cm, which is higher as compared with this resistivity, that is, the resistivity of the fixed magnetic layer of the general magnetoresistive effect type of head, 50 $\mu\Omega$ cm or less.

To achieve the above-mentioned object, the present invention provides a first information-reproducing system, having a magnetic head for detecting magnetization of points in a magnetic storage medium storing information according to a direction of magnetization, said magnetic head being disposed coming closed to or contacting with the magnetic storage medium, for reproducing information according to magnetization of points in the magnetic storage medium detected by said magnetic head, wherein said magnetic head has a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said free magnetic layer has a first free magnetic layer, a second free magnetic layer laminated at a position farther from the fixed magnetic layer as compared with the first free magnetic layer, and an opposite-parallel-coupling intermediate layer interposed between the first free magnetic layer and the second free magnetic layer, in which magnetizations of the first and second free magnetic layers are coupled with one another in such a manner that the magnetizations are pointed in directions which are substantially parallel and mutually opposite, and said second free magnetic layer is formed with a material which is different from a material of said first free magnetic layer, and with a material in which an electron in said first free magnetic layer is subjected to an elastic scattering within said second free magnetic layer, within said opposite-parallel-coupling intermediate layer, and/or at the interface between said second free magnetic layer and said the opposite-parallel-coupling intermediate layer, said elastic scattering occurring at higher rate as compared with a case where said second free magnetic layer is formed with a material which is same as said first free magnetic layer.

The magnetic head of the first information-reproducing system corresponds to the first magnetoresistive effect type of head as mentioned above. According to this magnetic head, in a similar fashion to that of the first magnetoresistive effect type of head as mentioned above, MR rate of the magnetoresistive effect element is enhanced, and it is possible to obtain a magnetic head capable of providing a higher output.

Incidentally, there is considered an information-reproducing system in which the magnetic head of the first information-reproducing system is replaced by the magnetic head corresponding to the second magnetoresistive effect type of head. Thus, when the magnetic head corresponding to the second magnetoresistive effect type of head is adopted, in a similar fashion to that of the second magnetoresistive effect type of head as mentioned above, MR rate of the magnetoresistive effect element is enhanced, and it is possible to obtain an information-reproducing system capable of providing a higher output.

To achieve the above-mentioned object, the present invention provides a second information-reproducing system, having a magnetic head for detecting magnetization of points in a magnetic storage medium storing information according to a direction of magnetization, said magnetic head being disposed coming closed to or contacting with the magnetic storage medium, for reproducing information according to magnetization of points in the magnetic storage medium detected by said magnetic head, wherein said magnetic head has a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said fixed magnetic layer has a first fixed magnetic layer, a second fixed magnetic layer laminated at a position farther from the free magnetic layer as compared with the first fixed magnetic layer, and an opposite-parallel-coupling intermediate layer interposed between the first fixed magnetic layer and the second fixed magnetic layer, in which magnetizations of the first and second fixed magnetic layers are coupled with one another in such a manner that the magnetizations are pointed in directions which are substantially parallel and mutually opposite, and said second free magnetic layer is formed with a material which is different from a material of said first fixed magnetic layer, and with a material in which an electron in said first fixed magnetic layer is subjected to an elastic scattering within said second fixed magnetic layer, within said opposite-parallel-coupling intermediate layer, and/or at the interface between said second fixed magnetic layer and said the opposite-parallel-coupling intermediate layer, said elastic scattering occurring at higher rate as compared with a case where said second fixed magnetic layer is formed with a material which is same as said first fixed magnetic layer.

The magnetic head of the second information-reproducing system corresponds to the third magnetoresistive effect type of head as mentioned above. According to this magnetic head, in a similar fashion to that of the second magnetoresistive effect type of head as mentioned above, MR rate of the magnetoresistive effect element is enhanced, and it is possible to obtain a magnetic head capable of providing a higher output.

Incidentally, there is considered an information-reproducing system in which the magnetic head of the second information-reproducing system is replaced by the magnetic head corresponding to the fourth magnetoresistive effect type of head. Thus, when the magnetic head corresponding to the fourth magnetoresistive effect type of head is adopted, in a similar fashion to that of the fourth magnetoresistive effect type of head as mentioned above, MR rate of the magnetoresistive effect element is enhanced, and it is possible to obtain an information-reproducing system capable of providing a higher output.

To achieve the above-mentioned object, the present invention provides a third information-reproducing system, having a magnetic head for detecting magnetization of points in a magnetic storage medium storing information according to a direction of magnetization, said magnetic head being disposed coming closed to or contacting with the magnetic storage medium, for reproducing information according to magnetization of points in the magnetic storage medium detected by said magnetic head, wherein said magnetic head has a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said fixed magnetic layer has a hard magnetic layer laminated at a position farther from the free magnetic layer as compared with the fixed magnetic layer, and an opposite-parallel-coupling intermediate layer interposed between the fixed magnetic layer and the hard magnetic layer, in which magnetization of the fixed magnetic layer and magnetization of the hard magnetic layer are coupled with one another in such a manner that the magnetizations are pointed in directions which are substantially parallel and mutually opposite, and said hard magnetic layer has a resistivity higher than that of said fixed magnetic layer.

The magnetic head of the second information-reproducing system corresponds to the fifth magnetoresistive effect type of head as mentioned above. According to this magnetic head, in a similar fashion to that of the fifth magnetoresistive effect type of head as mentioned above, MR rate of the magnetoresistive effect element is enhanced, and it is possible to obtain a magnetic head capable of providing a higher output.

As mentioned above, according to the present invention, it is possible to provide a magnetoresistive effect type of head that is high in the magnetoresistive rate (MR rate) while including the laminated ferrimagnetic film.

BEST MODE FOR CARRYING OUT THE INVENTION

Embodiments of a magnetoresistive effect type of head of the present invention and an information-reproducing system of the present invention will be described hereinafter.

Figure 1:
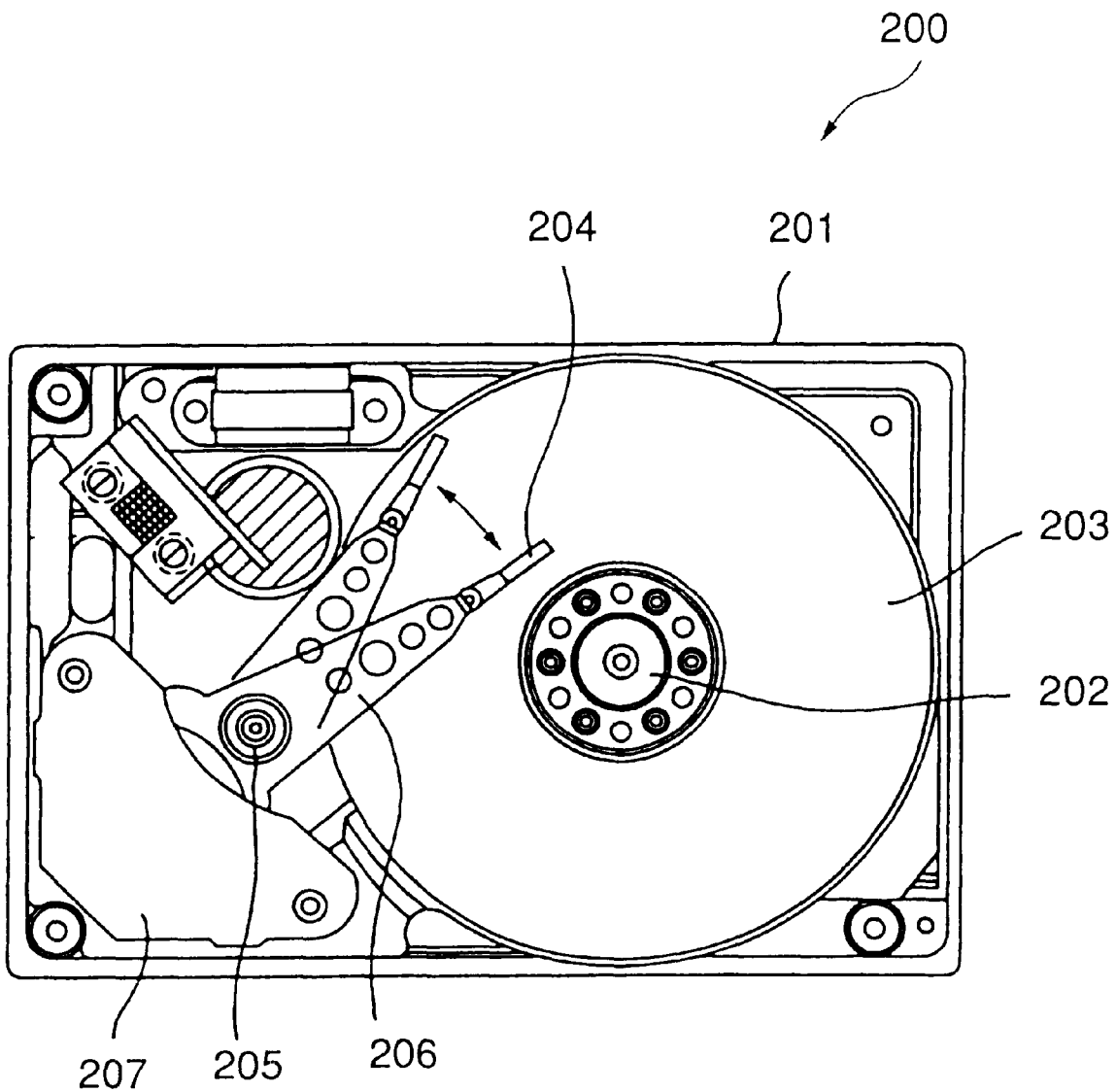
FIG. 1 is a view showing an internal structure of a hard disk drive of an embodiment of the present invention.

FIG. 1 is a view showing an internal structure of a hard disk drive of an embodiment of the present invention.

A hard disk drive (HDD) 200 corresponds to an information-reproducing system referred to in the present invention. A housing 201 of the HDD 200 accommodates a rotary shaft 202, a magnetic disk 203 mounted on the rotary shaft 202, a floating head slider 204 facing the magnetic disk 203, an arm shaft 205, a carriage arm 206 on the top of which the floating head slider 204 is fixed and which horizontally travels on the magnetic disk 203 on the arm shaft 205, and an actuator 207 for driving the carriage arm 206 on a horizontal travelling basis. To reproduce information stored in the magnetic disk 203, the carriage arm 206 is driven by the actuator 117 constituted of a magnetic circuit, so that the floating head slider 204 is positioned at a desired track on the magnetic disk 203 now rotating. The floating head slider 204 is provided with a magnetic head, which is not shown in FIG. 1, corresponding to the magnetoresistive effect type of head referred to in the present invention.

According to the present invention, as this magnetic head, there are adopted SVMR heads 10, 20, 30 and 40 which are a magnetoresistive effect type of head of the present embodiment as will be described latter. This magnetic head sequentially comes close to one-bit areas on tracks of the magnetic disk 203 as the magnetic disk 203 rotates, so that information carried by magnetization of the respective one-bit area is derived by an electric reproduction signal created in accordance with a magnetic field generated from magnetization of the respective one-bit area. A cover (not illustrated) closes the internal space of the housing 201.

Next, before explaining embodiments of a magnetoresistive effect type of head, for the purpose of understanding the magnetoresistive effect type of head of the present embodiment, there will be explained the conventional SVMR head having a spin valve of the simplest structure including no laminated ferrimagnetic film, and thereafter, there will be explained the magnetoresistive effect type of head of the present embodiment.

[Conventional Spin Valve Magnetoresistive Head having a Spin Valve of the simple structure]

Figure 2:
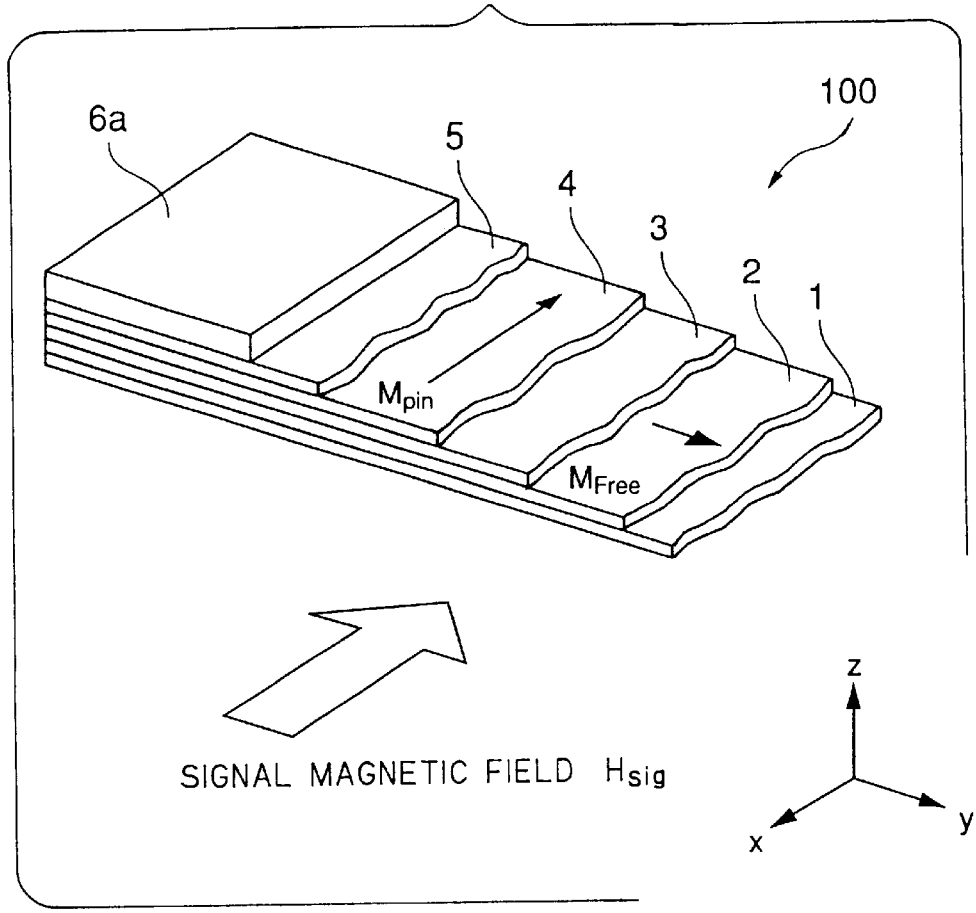
FIG. 2 is a perspective view of an essential part of a spin valve magnetoresistive head having the simplest structure including no laminated ferrimagnetic film.

FIG. 2 is a perspective view of an essential part of a spin valve magnetoresistive head having the simplest structure including no laminated ferrimagnetic film.

Figure 3:
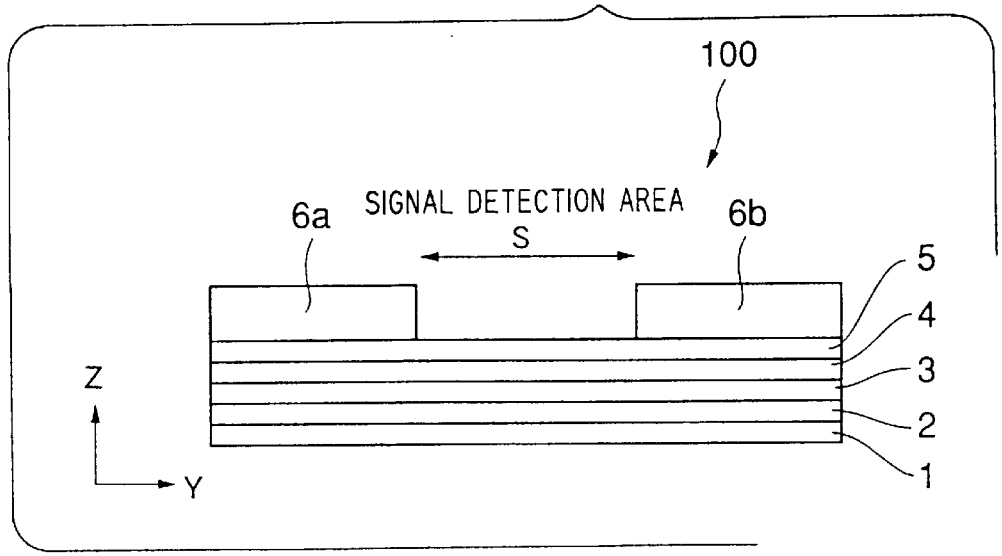
FIG. 3 is a sectional side elevation of the spin valve magnetoresistive head shown in FIG. 2.

FIG. 3 is a sectional side elevation of the spin valve magnetoresistive head shown in FIG. 2.

An SVMR head 100, which is shown in FIG. 2 and FIG. 3 as to the essential part, is provided with a spin valve element having a primary layer 1, a free magnetic layer 2 indicative of a soft magnetism in which a direction of magnetization formed on the primary layer 1 is rotated in accordance with a magnetic field from the exterior, a non-magnetic metal layer 3 formed on the free magnetic layer 2, a fixed magnetic layer 4 formed on the non-magnetic metal layer 3 and magnetized in a predetermined fixed direction, and an antiferromagnetic layer 5 formed on the fixed magnetic layer 4 for fixing a direction of magnetization of the fixed magnetic layer 4 through an exchange coupling with the fixed magnetic layer 4. The spin valve element corresponds to the magnetoresistive effect element referred to in the present invention. It is acceptable that a layer consisting of a hard magnetic material is used instead of the antiferromagnetic layer 5 in order to fix the direction of the magnetization of the fixed magnetic layer 4.

As shown in FIG. 2, the SVMR head 100 is provided with a pair of electrode terminals 6a and 6b in right and left on the antiferromagnetic layer 5 to cover both the edge portions of the antiferromagnetic layer 5. Further, there is formed a pair of hard magnetic layers (not illustrated) so as to contact with both the edge portions of the free magnetic layer 2. Those hard magnetic layers fix the magnetic wall of the free magnetic layer 2 to suppress a generation of the Barkhausen noise that is easy to appear on a reproduction signal of a head. The SVMR head 100 detects a signal magnetic field from the magnetic disk on a signal detection area S between the electrode terminals 6a and 6b in pair. Incidentally, hereinafter, in order to specify a magnetization direction and the like as to the SVMR head 100, as shown in FIG. 1, a direction of a film thickness of the spin valve element, that is, a direction of a laminated layer of the above-mentioned layers is denoted by a z-direction, a direction coupling between the electrode terminals 6a and 6b in pair is denoted by a y-direction, and a direction perpendicular to a y-z plane is denoted by an x-direction. As will be seen from ways of the definition of those directions, hereinafter, with respect to the x-direction, the y-direction and the z-direction, a distinction as to a direction such as x-direction and -x-direction is not given. The SVMR head 100 is used coming close to the magnetic disk. When the SVMR head 100 comes close to the magnetic disk, the z-direction corresponds to a direction in which the track of the magnetic disk extends, the y-direction corresponds to a direction of a width of the track, and x-direction corresponds to a direction perpendicular to the face of the magnetic disk.

Hereinafter, there will be explained an example of a method of fabrication of the conventional SVMR head 100 having the simple structure in conjunction with FIG. 2. On a substrate consisting of an alumina titanium carbide ($Al_2O_3$-Tic) that is a ceramic of insulating properties, in turn, a primary layer 1 (thickness 50 Å) consisting of Ta is formed, a free magnetic layer 2 consisting of two layer films of NiFe (20 Å)/CoFeB (15 Å) is formed on the primary layer 1, a non-magnetic metal layer 3 (30 Å) consisting of Cu is formed on the free magnetic layer 2, a fixed magnetic layer 4 (20 Å) consisting of CoFeB is formed on the non-magnetic metal layer 3, and a layer (500 Å) consisting of NiO or a layer (150 Å) consisting of PdPtMn is formed on the fixed magnetic metal layer 4 in form of an antiferromagnetic layer 5. And in the event that PdPtMn is used for the antiferromagnetic layer 5, a protection layer (100 Å) not illustrated consisting of Ta is formed on the antiferromagnetic layer 5. Those layers are continuously formed by means of spattering and the like. At that time, it is acceptable that a conductive mirror reflection file, for example, Au (5 Å) and Ag (5 Å), or an insulating property of mirror reflection file, for example, Ta—O and non-magnetic Co—Fe—O is inserted between the primary layer 1 and the free magnetic layer 2.

The multi-layer film thus formed becomes a spin valve element subjected to patterning to a shape of an element by a lithography technology, and a hard magnetic layer for applying a bias to the terminal electrode and the free magnetic layer is formed on the spin valve element.

An operational principle of the conventional SVMR head 100 will be briefly explained in conjunction with FIG. 2.

In the spin valve element of the SVMR head 100, the antiferromagnetic layer 5 has an exchange mutual effect on the fixed magnetic layer 4 contacted with the antiferromagnetic layer 5, so that magnetization $M_{pin}$ of the fixed magnetic layer 4 is fixed in the x-direction by the exchange mutual effect. To the contrary, in the free magnetic layer 2, a direction of the magnetic anisotropy, that is, an easy axis of magnetization takes the y-direction. Magnetization $M_{free}$ of the free magnetic layer 2 points the y-direction when no external magnetic field exists. When a weak external signal magnetic field $H_{sig}$ is applied to the free magnetic layer 2, the magnetization $M_{free}$ rotates in accordance with the signal magnetic field $H_{sig}$. The y-direction is the same direction as the direction of the magnetic field that the hard magnetic layer contacting with the free magnetic layer 2 applies to the free magnetic layer 2.

An electric resistance of the spin valve element is varied in accordance with an angle θ defined by a direction of the magnetization $M_{free}$ rotated in accordance with the signal magnetic field $H_{sig}$, of the free magnetic layer 2 and a direction of the fixed magnetization $M_{pin}$ of the fixed magnetic layer 4. That is, a resistance R between both the electrode terminals 6a and 6b is varied in proportion to a cosine of the angle θ defined by the directions of the magnetization of both the layers, that is, cos θ as follows.

$$R=R_{min}+(R_w/2)\times(1-\cos\theta)$$

Where $R_{min}$ denotes a resistive value in case of θ=0° wherein the magnetization $M_{pin}$ and the magnetization $M_{free}$ point the same direction, and $R_w$ denotes a difference between the maximum value and the minimum value of a resistance value R that is varied in accordance with the external magnetic field. The resistance value R offers the maximum in case of θ=180° wherein the direction of the magnetization $M_{pin}$ and the direction of the magnetization $M_{free}$ are mutually opposite. In the SVMR head 100, when the signal magnetic field $H_{sig}$ is zero, the angle θ is 90°.

When the SVMR head 100 is operated, a sense current conducts from the pair of electrode terminals 6a and 6b shown in FIG. 3 to the spin valve element. In a state that the sense current conducts, when the SVMR head 100 is relatively moved coming close to a magnetic disk (not illustrated), upon receipt of the signal magnetic field $H_{sig}$ substantially directed to the x-direction from the magnetic disk in a signal detection area S shown in FIG. 3, an electric resistance of the spin valve element of is successively varied in accordance with the signal magnetic field $H_{sig}$ with the rotation of the magnetization $M_{free}$ as mentioned above, so that the SVMR head 100 outputs a voltage of a voltage value represented by a product of a value of the successively varied electric resistance and a value of the sense current.

As mentioned above, in the event that the angle θ is 90° wherein when the signal magnetic field $H_{sig}$ is zero, the direction of the magnetization $M_{pin}$ are perpendicular to the direction of the magnetization $M_{free}$, the resistance and the output voltage of the spin valve element are linearly varied in accordance with the signal magnetic field $H_{sig}$ from the external magnetic disk.

Figure 4:
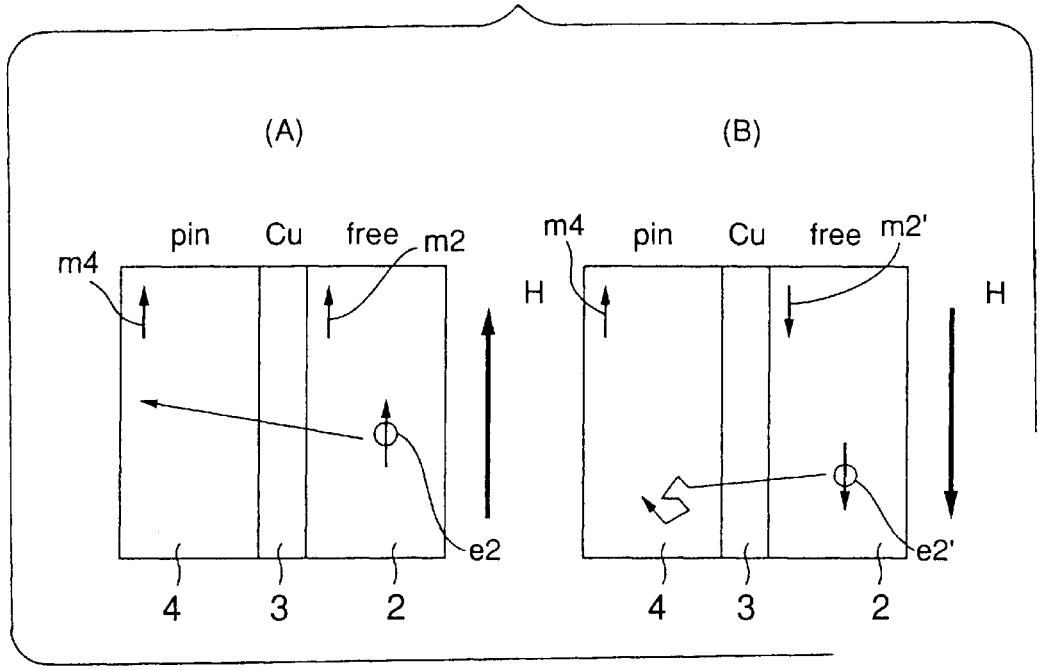
FIG. 4 is a typical illustration useful for understanding a spin-dependent scattering of electrons in a conventional spin valve magnetoresistive head having the simple structure.

FIG. 4 is a typical illustration useful for understanding a spin-dependent scattering of electrons in a conventional spin valve magnetoresistive head having the simple structure.

FIG. 4(A) and FIG. 4(B) show, of a plurality of layers constituting the spin valve element of the SVMR head 100, a free magnetic layer 2, a non-magnetic metal layer 3 and a fixed magnetic layer 4 in the named order from the right to the left. In those figures, the layer appearing at the right side corresponds to the layer appearing at the lower side of the SVMR head 100 shown in FIG. 2, and the layer appearing at the left side corresponds to the layer appearing at the upper side of the SVMR head 100 shown in FIG. 2. In those figures, the horizontal direction corresponds to the z-direction that is the direction in which a track of the magnetic disk extends, and the vertical direction corresponds to the x-direction that is the direction perpendicular to a face of the magnetic disk.

FIG. 4(A) shows a state that a magnetic field H is applied from the magnetic disk to the SVMR head 100 upward with respect to the drawing of FIG. 4(A). FIG. 4(B) shows a state that a magnetic field H is applied from the magnetic disk to the SVMR head 100 downward with respect to the drawing of FIG. 4(A). Magnetization of the fixed magnetic layer 4 is fixed upward independently of a direction of the magnetic field H, and magnetization of the free magnetic layer 2 points the same direction as the magnetic field H. Accordingly, as shown in FIG. 4(A), when the magnetic field H is applied upward, a direction m2 of the magnetization of the free magnetic layer 2 and a direction m4 of the magnetization of the fixed magnetic layer 4 point upward. As shown in FIG. 4(B), when the magnetic field H is applied downward, the direction m4 of the magnetization of the fixed magnetic layer 4 points upward, while the direction m2' of the magnetization of the free magnetic layer 2 points downward.

Electrons of the free magnetic layer 2 and the fixed magnetic layer 4 have, in average of the respective layer, spins of the same direction as that of magnetization of the respective layer. As shown in FIG. 4(A), in a state that the magnetization of the free magnetic layer 2 and the magnetization of the fixed magnetic layer 4 point upward, for example, an electron existing in the free magnetic layer 2 and having a spin of the same direction as that of magnetization of the free magnetic layer 2, which is expressed by white circle e2 involving an arrow, is hard to bring about scattering (inelastic scattering) involving an energy loss even if the electron enters the fixed magnetic layer 4. However, as shown in FIG. 4(B), in a state that the magnetization of the free magnetic layer 2 and the magnetization of the fixed magnetic layer 4 point mutually opposite directions, for example, an electron existing in the free magnetic layer 2 and having a spin of the same direction as that of magnetization of the free magnetic layer 2, which is expressed by white circle e2' involving an arrow, is subjected to the inelastic scattering when the electron enters the fixed magnetic layer 4, so that the electron is short in scattering mean free path. A resistance of the spin valve element is varied in accordance with the external magnetic field owing to a spin-dependence scattering of electrons, in which a spattering probability of electrons depends on a direction of a spin of an electron to a direction of magnetization of the respective layer, so that the SVMR head 100 detects a variation of the external magnetic field through a variation of the resistance. Incidentally, hereinafter, the inelastic scattering denotes an inelastic scattering by the spin-dependence scattering.

[Magnetoresistive Effect Type of Head of the Present Embodiment]

Hereinafter, there will be explained first to fourth embodiments of a magnetoresistive effect type of head of the present invention.

Any of the magnetoresistive effect type of heads of the first, second, third and fourth embodiments is provided with a spin valve element using a laminated ferrimagnetic film. As the spin valve element using a laminated ferrimagnetic film, there are known typical four types of spin valve element, of a type A, a type B, a compound type of the type A and the type B, and a type C, which will be described latter. The magnetoresistive effect type of heads of the first, second, third and fourth embodiments have spin valve elements of the type A, the type B, the compound type of the type A and the type B, and the type C, respectively. Hereinafter, the magnetoresistive effect type of heads of the first, second, third and fourth embodiments will be explained in comparison with the conventional magnetoresistive effect type of heads having the same types of spin valve elements, respectively.

<Magnetoresistive Effect Type of Head of the First Embodiment>

A magnetoresistive effect type of head of the first embodiment has a type A of spin valve element.

Figure 5:
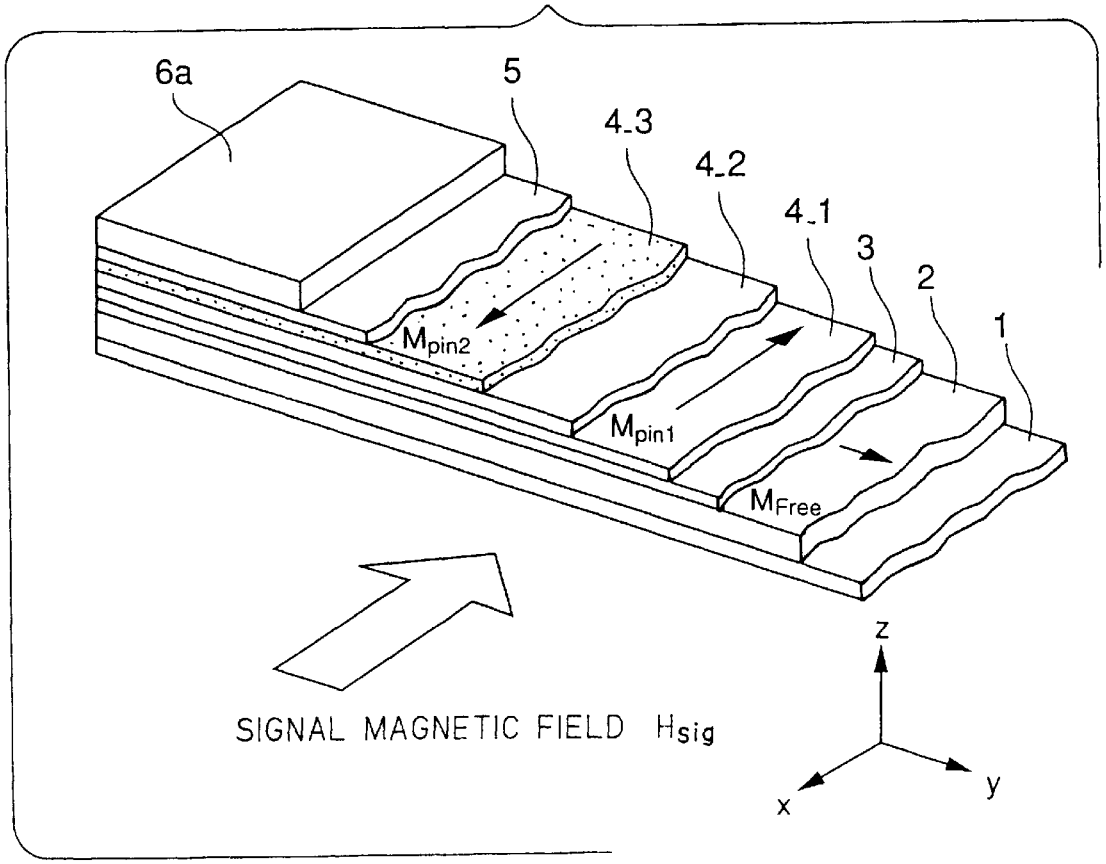
FIG. 5 is a perspective view of an essential part of a magnetoresistive effect type of head of a first embodiment.

FIG. 5 is a perspective view of an essential part of a magnetoresistive effect type of head of a first embodiment.

In the type A of spin valve element of the SVMR head 10 shown in FIG. 5, as compared with the conventional SVMR head 100 having the simple structure, the fixed magnetic layer 4 of the single layer is replace by a laminated ferrimagnetic film consisting of a first fixed magnetic layer 4_1/an opposite-parallel-coupling intermediate layer 4_2/a second fixed magnetic layer 4_3. Magnetization of the first fixed magnetic layer 4_1 and magnetization of the second fixed magnetic layer 4_3 are coupled with one another through the opposite-parallel-coupling intermediate layer 4_2 in such a manner that they are substantially parallel and point mutually opposite directions. The second fixed magnetic layer 4_3 consists of a material different from the second fixed magnetic layer 4_1 and has resistivity higher than that of first fixed magnetic layer 4_1.

Hereinafter, there will be explained an example of a method of manufacturing the SVMR head 10 in conjunction with FIG. 5. On a substrate consisting of an alumina titanium carbide ($Al_2O_3$-Tic), a primary layer 1 (thickness 50 Å) consisting of Ta is formed, a free magnetic layer 2 consisting of two layer films of NiFe (20 Å) and CoFeB (15 Å) formed on the layer film of NiFe is formed on the primary layer 1, a non-magnetic metal layer 3 (30 Å) consisting of Cu is formed on the free magnetic layer 2, a first fixed magnetic layer 4_1 (30 Å) consisting of CoFeB is formed on the non-magnetic metal layer 3, an opposite-parallel-coupling intermediate layer 4_2 (8 Å) consisting of Ru is formed on the first fixed magnetic layer 4_1, a second fixed magnetic layer 4_3 (30 Å) consisting of Fe—Al—O is formed on the opposite-parallel-coupling intermediate layer 4_2, a layer (500 Å) consisting of NiO or a layer (150 Å) consisting of PdPtMn is formed on the second fixed magnetic layer 4_3 in form of an antiferromagnetic layer 5. And in the event that PdPtMn is used for the antiferromagnetic layer 5, a protection layer (100 Å) not illustrated consisting of Ta is formed on the antiferromagnetic layer 5. Those layers are continuously formed by means of spattering and the like. Incidentally, as composition of the above-mentioned Fe—Al—O, there are raised, for example, $Fe_{90}(Al_2O_3)_{10}$ (atom %). Also with respect to Fe—Al—O as will be described hereinafter, it is suitable that the same composition is applied. At that time, it is acceptable that a conductive mirror reflection file, for example, a film consisting of Au (5 Å) and a film consisting of Ag (5 Å), or an insulating property of mirror reflection file, for example, Ta—O and non-magnetic Co—Fe—O is inserted between the primary layer 1 and the free magnetic layer 2.

The multi-layer film thus formed becomes a spin valve element subjected to patterning to a shape of an element by a lithography technology, and a hard magnetic layer for applying a bias to the terminal electrode and the free magnetic layer is formed on the spin valve element.

It is preferable that the second fixed magnetic layer 4_3 consists of a soft magnetic material of 30 Oe or less in coercive force, such as the above-mentioned Fe—Al—O.

In the type A of spin valve element of the SVMR head 10 thus manufactured, as mentioned above, a portion of the fixed magnetic layer becomes a laminated ferrimagnetic film, and the direction of the magnetization of the first fixed magnetic layer 4_1 and the direction of the magnetization of the second fixed magnetic layer 4_3 are pointed in directions which are substantially parallel and mutually opposite. In this state, since the opposite magnetic field to the magnetization of both the fixed magnetic layers is weakened, the magnetization of the fixed magnetic layers is subjected to strong pinning. Reducing a height in element of the spin valve element, maintaining the strong pinning of the magnetization, make it possible to increase a reproduction output of the SVMR head 10.

Here, for the purpose of comparison, now let us consider an SVMR head having the conventional type A of spin valve element having the second fixed magnetic layer 14_3 consisting of the same material as the first fixed magnetic layer 4_1 and having the same resistivity, different from the second fixed magnetic layer 4_3 of the SVMR head, in which a laminated ferrimagnetic film is simply introduced into the fixed magnetic layer, that is, the SVMR head 10.

Also with respect to the conventional SVMR head, providing a laminated ferrimagnetic film on a portion of the fixed magnetic layer and reducing a height in element make it possible to increase a reproduction output. However, according to the conventional SVMR head, as will be described hereinafter, the MR rate is reduced per se as compared with the conventional SVMR head 100 having the simple structure.

Figure 6:
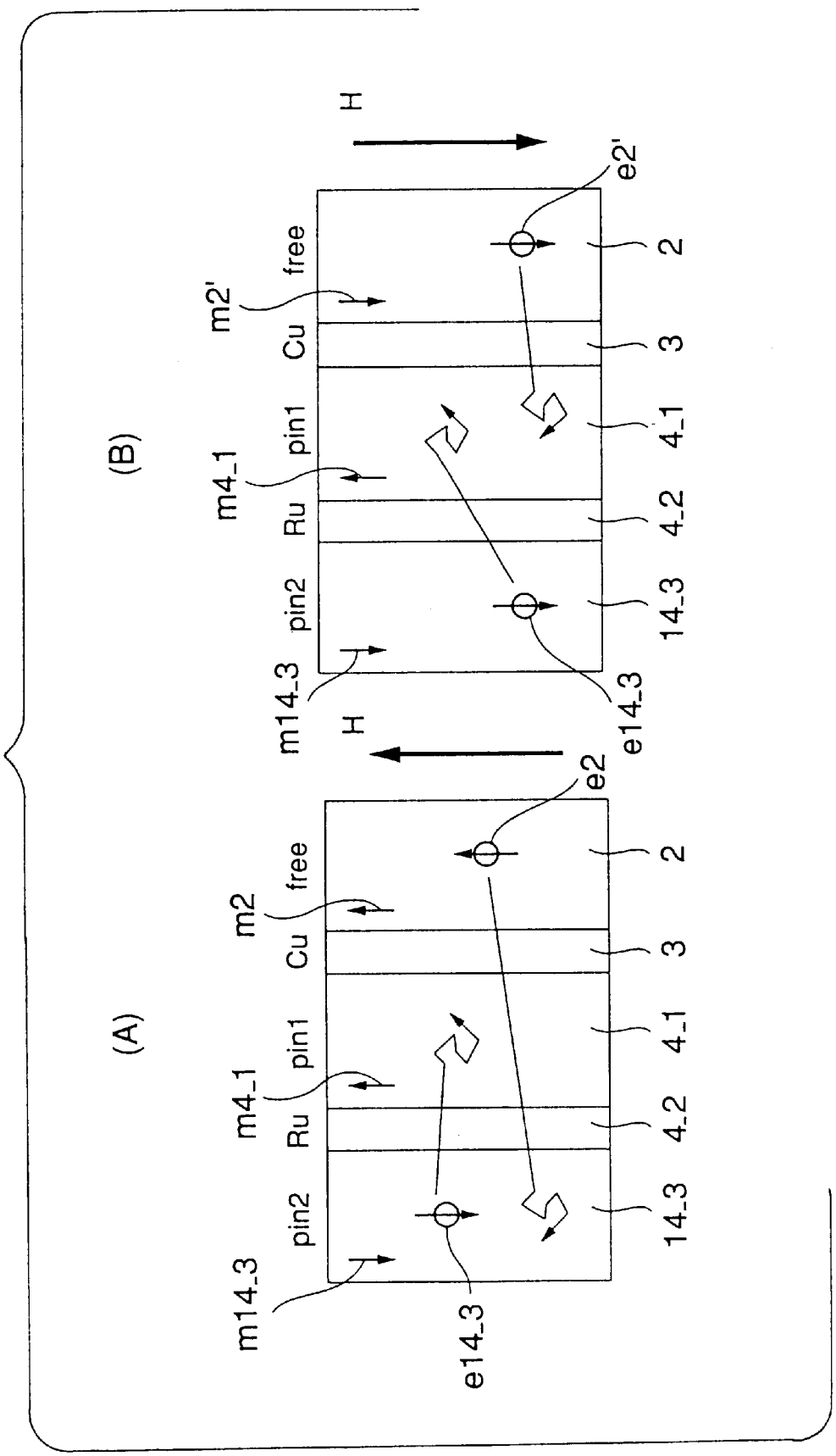
FIG. 6 is a typical illustration useful for understanding a spin-dependent scattering of electrons in a conventional type A of spin valve element.

FIG. 6 is a typical illustration useful for understanding a spin-dependent scattering of electrons in a conventional type A of spin valve element.

FIG. 6(A) and FIG. 6(B) show a state that of the free magnetic layer 2, the non-magnetic metal layer 3 and the fixed magnetic layer 4, shown in FIG. 4(A) and FIG. 4(B), the fixed magnetic layer 4 is replaced by a laminated ferrimagnetic film of the conventional type A of spin valve element, which consists of a first fixed magnetic layer 4_1, an opposite-parallel-coupling intermediate layer 4_2 and a second fixed magnetic layer 4_3, in the order from the side near the non-magnetic metal layer 3. As shown in FIG. 6(A), in the event that the external magnetic field points upward, a direction m2 of magnetization of the free magnetic layer 2 points upward. And as shown in FIG. 6(B), in the event that the external magnetic field points downward, a direction m2' of magnetization of the free magnetic layer 2 points downward. Further, as shown in those figures, a direction m4_1 of magnetization of the first fixed magnetic layer 4_1 always points upward independently of a direction of the external magnetic field, and a direction m14_3 of magnetization of the second fixed magnetic layer 14_3 always points downward.

In the state shown in FIG. 6(A), electron e2 of a spin directed upward, which is represented by a white circle involving an arrow in the free magnetic layer 2, is not subjected to inelastic scattering when it enters the first fixed magnetic layer 4_1. However, when the electron e2 enters the second fixed magnetic layer 14_3, it is subjected to inelastic scattering. In the state shown in FIG. 6(B), electron e2' of a spin directed downward, which is represented by a white circle involving an arrow in the free magnetic layer 2, is subjected to inelastic scattering when it enters the first fixed magnetic layer 4_1. However, when the electron e2' enters the second fixed magnetic layer 14_3, it is not subjected to inelastic scattering. In the state shown in FIG. 6(A), the direction m2 of magnetization of the free magnetic layer 2 and the direction m4_1 of magnetization of the first fixed magnetic layer 41 near the free magnetic layer 2 point the same direction. Accordingly, a resistance of the spin valve element is small in its entirety. On the other hand, in the state shown in FIG. 6(B), the direction m2 of magnetization of the free magnetic layer 2 and the direction m4_1 of magnetization of the first fixed magnetic layer 4_1 point mutually opposite directions. Accordingly, a resistance of the spin valve element is large in its entirety. That is, in the event that the portion of the fixed magnetic layer is formed with a laminated ferrimagnetic film, a resistance of the spin valve element in its entirety due to the direction of the external magnetic field has a tendency of variations in a similar fashion to that of the resistance of the conventional spin valve element having the simple structure of which the state is shown in FIG. 4. However, in the event that the portion of the fixed magnetic layer is formed with a laminated ferrimagnetic film, the direction m14_3 of magnetization of the second fixed magnetic layer 14_3 and the direction m4_1 of magnetization of the first fixed magnetic layer 4_1 point mutually opposite directions. Accordingly, with respect to variations in resistance by the magnetoresistive effect, the existence of the second fixed magnetic layer 14_3 brings about an opposite effect to the first fixed magnetic layer 4_1, so that the magnetoresistive effect of the spin valve element is weakened and the MR ratio is reduced.

In any state of FIG. 6(A) and FIG. 6(B), an electron e43 of a spin directed downward in the second fixed magnetic layer 4_3 is easy to be subjected to the inelastic scattering when it enters the first fixed magnetic layer 4_1, and as a result of the inelastic scattering, the spin valve element increase in resistivity by a predetermined resistance increment independently of a direction of the external magnetic field H. Thus, the increment of the resistivity also serves to reduce MR ratio.

However, according to the SVMR head 10 of the above-mentioned first embodiment, since a high resistive material is used for the second fixed magnetic layer 4_3, as will be described hereinafter, MR ratio is increased as compared with the SVMR head having the conventional type A of spin valve element.

Figure 7:
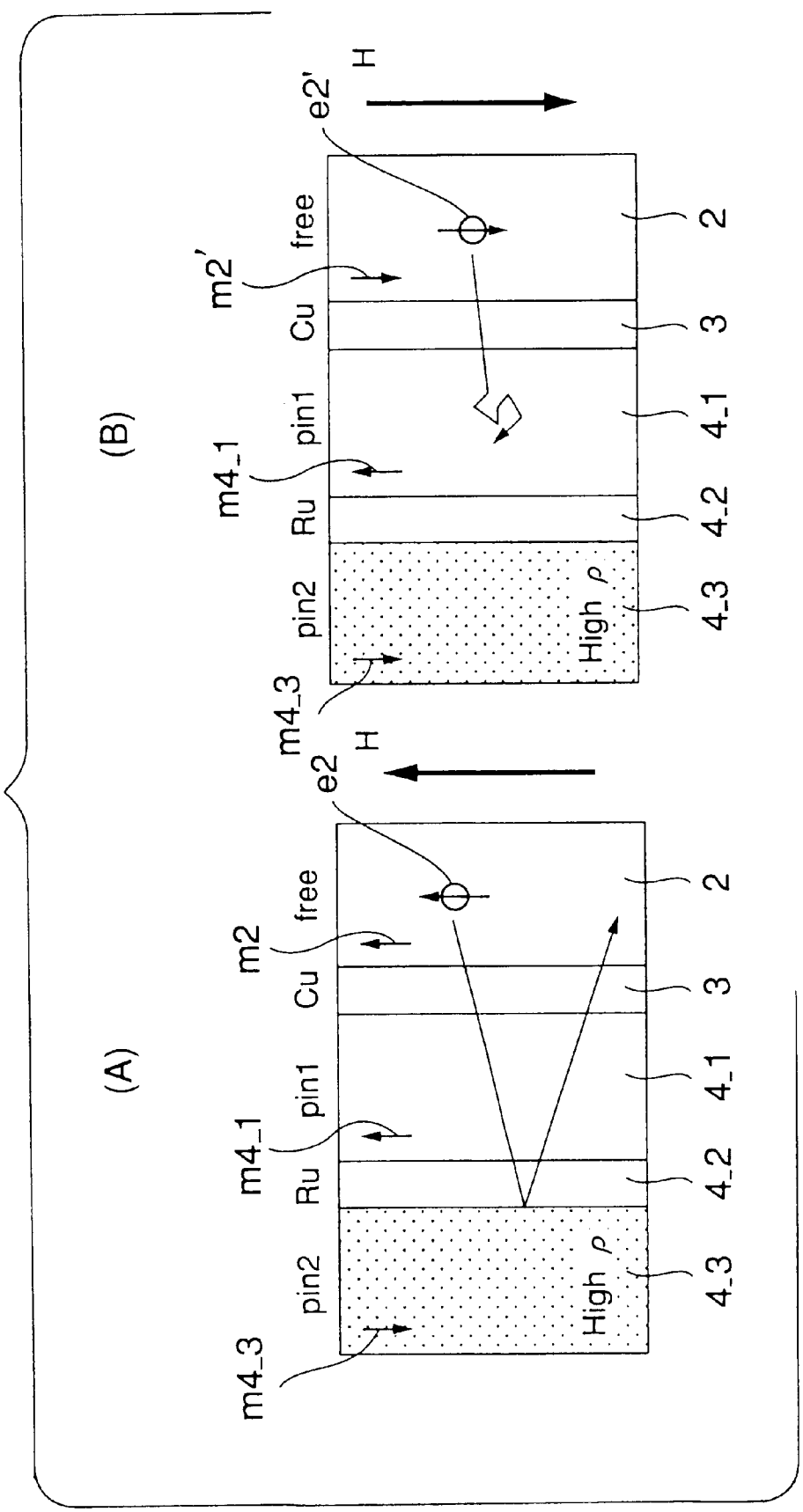
FIG. 7 is a typical illustration useful for understanding a state of a spin-dependent scattering of a spin valve element in an SVMR head 10 of a first embodiment.

FIG. 7 is a typical illustration useful for understanding a state of a spin-dependent scattering of a spin valve element in an SVMR head 10 of a first embodiment.

FIG. 7(A) and FIG. 7(B) show a state that the second fixed magnetic layer 14_3 shown in FIG. 6(A) and FIG. 6(B) is replaced by the second fixed magnetic layer 4_3 having a high resistance. Magnetization of the respective layer points the same direction as the magnetization of the associated layer in FIG. 6.

In a state shown in FIG. 7(A), an electron e2 of a spin directed upward, which is represented by a white circle involving an arrow in the free magnetic layer 2, is hard to enter the second fixed magnetic layer 4_3 even if it passes through the first fixed magnetic layer 4_1. Thus, the electron e2 is subjected to an elastic scattering within an opposite-parallel-coupling intermediate layer 4_2, within a second fixed magnetic layer 4_3, and/or at the interface between the opposite-parallel-coupling intermediate layer 4_2 and the second fixed magnetic layer 4_3, so that the electron e2 may return to the first fixed magnetic layer 4_1. When the electron is subjected to the elastic scattering, a probability that the electron is subjected to the inelastic scattering is greatly reduced as compared with the state shown in FIG. 6(A). Accordingly, a resistance of the spin valve element is small in its entirety. On the other hand, in the state shown in FIG. 7(B), electron e2' of a spin directed downward, which is represented by a white circle involving an arrow in the free magnetic layer 2, is easy to be subjected to inelastic scattering in the first fixed magnetic layer 4_1. However, even if the electrons e2' pass through first fixed magnetic layer 4_1 without being subjected to inelastic scattering in the first fixed magnetic layer 4_1, almost of all the electrons e2' do not enter the second fixed magnetic layer 4_3, and are subjected to elastic scattering in a similar fashion to that of the state shown in FIG. 7(A), so that the electrons return to the first fixed magnetic layer 4_1 in which the electrons are easy to be subjected to inelastic scattering. Thus, in the state shown in FIG. 7(B), a probability that the electron is subjected to the inelastic scattering is increased as compared with the state shown in FIG. 6(B). Accordingly, a resistance of the spin valve element is incremented in its entirety. In this manner, since almost of all the electrons do not enter the second fixed magnetic layer 4_3 of high resistance, the resistive variation, which will occur in accordance with a change of a direction of the external magnetic field, is increased. Accordingly, the SVMR head 10 of the first embodiment has a larger MR ratio as compared with the conventional SVMR head using a laminated ferrimagnetic film on the portion of the fixed magnetic layer. An adoption of the second fixed magnetic layer 4_3 consisting of a material of a high resistance makes it hard that a sense current conducts the second fixed magnetic layer 4_3, but the sense current effectively conducts through the free magnetic layer 2, the non-magnetic metal layer 3 and the first fixed magnetic layer 4_1, which are directly associated with the magnetoresistive effect, of the spin valve element. The fact that the sense current effectively conducts through the portions, which are directly associated with the magnetoresistive effect, of the spin valve element, also makes it possible to enhance the MR ratio of the SVMR head 10.

To begin with, such an idea that a laminated ferrimagnetic film is used on a portion of the fixed magnetic layer purely intends to improve characteristics on the magnetic plane in such a manner that the opposite magnetic field of the portion of the fixed magnetic layer is suppressed to reduce magnetization of the laminated film in its entirety. The above-mentioned reduction of the MR ratio is one obtained on a side effect basis by introducing the second fixed magnetic layer. This reduction of the MR ratio can be suppressed, as mentioned above, in such a manner that a high resistance of film is used for the second fixed magnetic layer 4_3 so that almost all the sense current conducts through the first fixed magnetic layer. In order to effectively perform the suppression of reduction of the MR ratio, it is preferable that the second fixed magnetic layer 4_3 has a resistivity not less than 200 $\mu\Omega$ cm, which is generally larger than a resistivity of the antiferromagnetic layer 5. Further, it is more preferable that a resistivity of the second fixed magnetic layer 4_3 is higher. When a high resistive layer is used for the second fixed magnetic layer 4_3 to substantially block the sense current conducting through the second fixed magnetic layer 4_3, it is possible to substantially completely suppress the reduction of MR.

<Magnetoresistive Effect Type of Head of the Second Embodiment>

A magnetoresistive effect type of head of the second embodiment has a type B of spin valve element.

Figure 8:
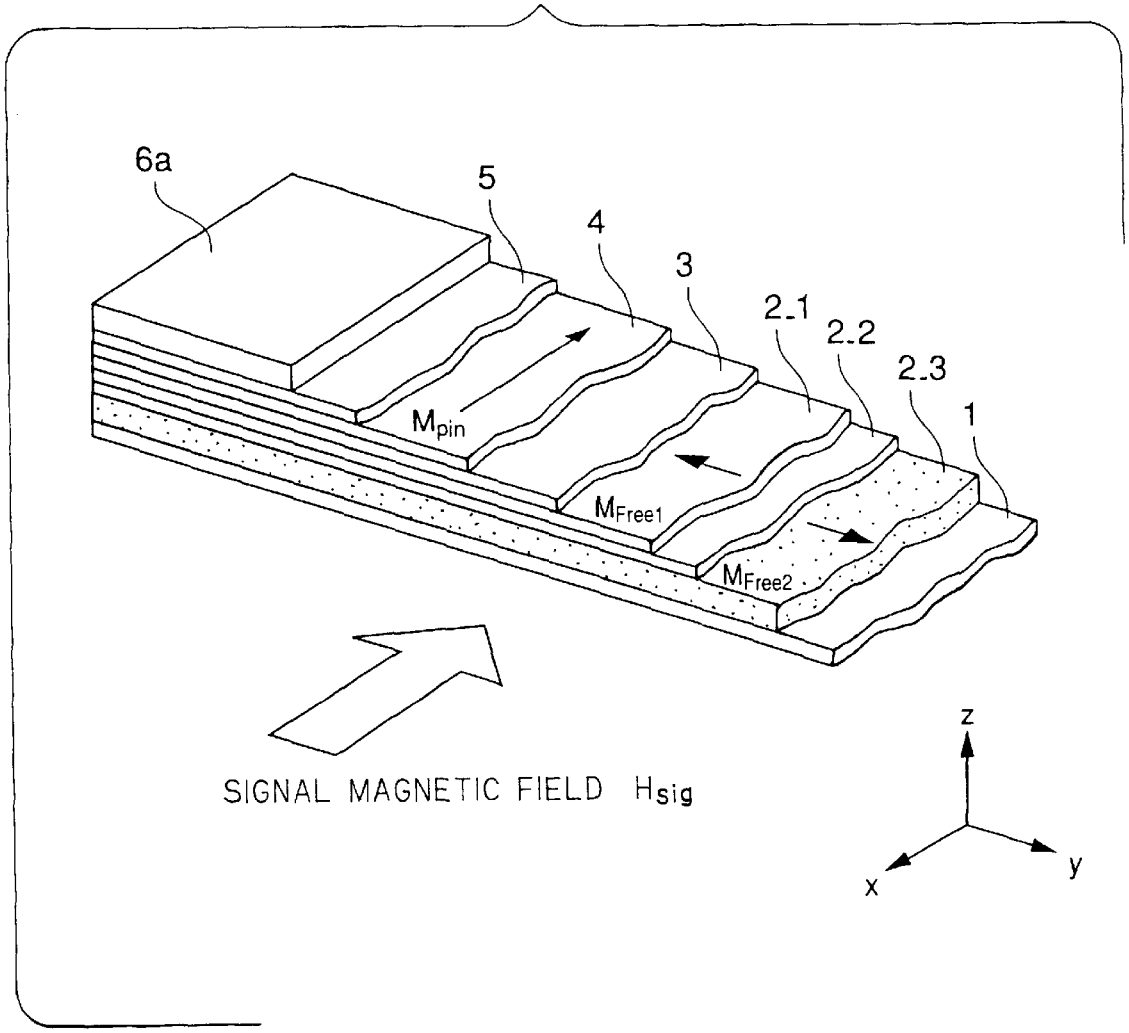
FIG. 8 is a perspective view of an essential part of a magnetoresistive effect type of head of a second embodiment.

FIG. 8 is a perspective view of an essential part of a magnetoresistive effect type of head of a second embodiment.

In the type B of spin valve element of the SVMR head 20 shown in FIG. 8, as compared with the conventional SVMR head 100 having the simple structure, the free magnetic layer 2 of the single layer is replace by a laminated ferrimagnetic film consisting of a second free magnetic layer 2_3/an opposite-parallel-coupling intermediate layer 2_2/a first free magnetic layer 2_1. Magnetization of the first free magnetic layer 2_1 and magnetization of the second free magnetic layer 2_3 are coupled with one another through the opposite-parallel-coupling intermediate layer 2_2 in such a manner that they are substantially parallel and point mutually opposite directions. The first free magnetic layer 2_1 consists of a material different from the second free magnetic layer 2_3, and the second free magnetic layer 2_3 has a resistivity higher than that of first free magnetic layer 2_1.

Hereinafter, there will be explained an example of a method of manufacturing the SVMR head 20 in conjunction with FIG. 8. On a substrate consisting of an alumina titanium carbide ($Al_2O_3$-Tic), a primary layer 1 (thickness 30 Å) consisting of Ta is formed, a second free magnetic layer 2_3 (30 Å) consisting of Fe—Al—O is formed on the primary layer 1, an opposite-parallel-coupling intermediate layer 2_2 (8 Å) consisting of Ru is formed on the second free magnetic layer 2_3, a first free magnetic layer 2_1 (30 Å) consisting of CoFeB is formed on the opposite-parallel-coupling intermediate layer 2_2, a nonmagnetic metal layer 3 (30 Å) consisting of Cu is formed on the first free magnetic layer 2_1, a fixed magnetic layer 4 (20 Å) consisting of CoFeB is formed on the non-magnetic metal layer 3, a layer (500 Å) consisting of NiO or a layer (150 Å) consisting of PdPtMn is formed on the fixed magnetic layer 4 in form of an antiferromagnetic layer 5. And in the event that the layer consisting of PdPtMn is used for the antiferromagnetic layer 5, a protection layer (100 Å) not illustrated consisting of Ta is formed on the antiferromagnetic layer 5. Those layers are continuously formed by means of sputtering and the like. At that time, it is acceptable that a conductive mirror reflection film, for example, a film consisting of Au (5 Å) and a film consisting of Ag (5 Å), or an insulating property of mirror reflection film, for example, Ta—O and non-magnetic Co—Fe—O is inserted between the primary layer 1 and the free magnetic layer 2.

The multi-layer film thus formed becomes a spin valve element subjected to patterning to a shape of an element by a lithography technology, and a hard magnetic layer for applying a bias to the terminal electrode and the free magnetic layer is formed on the spin valve element.

It is preferable that the second free magnetic layer 2_3 consists of a soft magnetic material of 300e or less in coercive force, such as the above-mentioned Fe—Al—O.

In the type B of spin valve element of the SVMR head 20 thus manufactured, as mentioned above, a portion of the free magnetic layer becomes a laminated ferrimagnetic film, and the direction of the magnetization of the first free magnetic layer 2_1 and the direction of the magnetization of the second free magnetic layer 2_3 are pointed in directions which are substantially parallel and mutually opposite. In this state, since the opposite magnetic field to the magnetization of both the fixed magnetic layers is weakened, reduction of a height in element of the spin valve element makes it possible to increase a reproduction output of the SVMR head 20.

Here, for the purpose of comparison, now let us consider an SVMR head having the conventional type B of spin valve element having the second free magnetic layer 12_3 consisting of the same material as the first free magnetic layer 2_1 and having the same resistivity, different from the second free magnetic layer 2_3 of the SVMR head, in which a laminated ferrimagnetic film is simply introduced into the fixed magnetic layer, that is, the SVMR head 20.

According to the conventional SVMR head having a laminated ferrimagnetic film on a portion of the free magnetic layer, in a similar fashion to that of the conventional SVMR head having a laminated ferrimagnetic film on a portion of the fixed magnetic layer, the MR rate is reduced per se as compared with the conventional SVMR head 100 having the simple structure. This reduction of MR rate is implemented, as will be described hereinafter, in a similar fashion to that of the conventional SVMR head having a laminated ferrimagnetic film on a portion of the fixed magnetic layer, through simply replacing the fixed magnetic layer by the free magnetic layer with respect to the laminated ferrimagnetic film.

Figure 9:
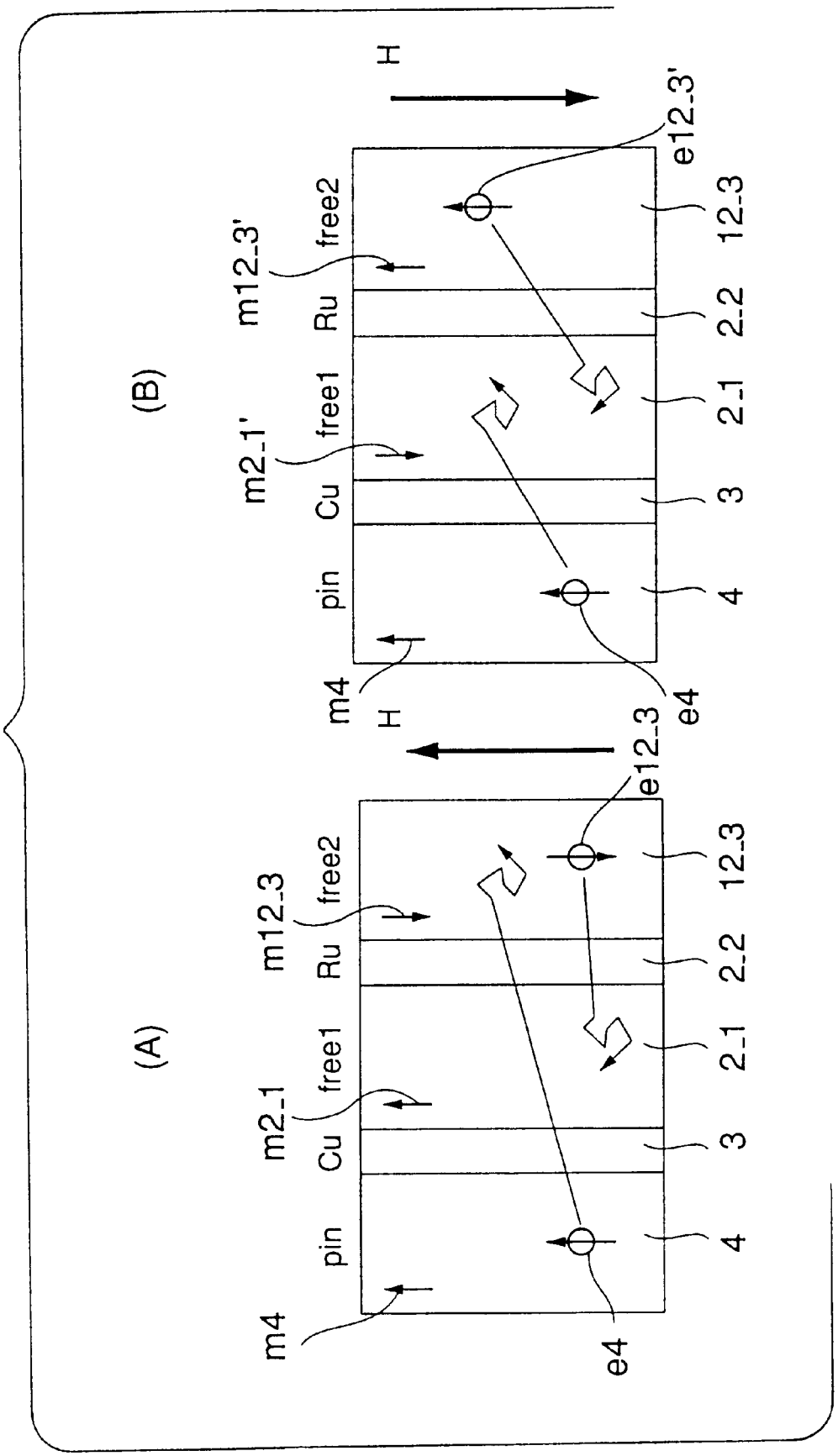
FIG. 9 is a typical illustration useful for understanding a spin-dependent scattering of electrons in a conventional type B of spin valve element.

FIG. 9 is a typical illustration useful for understanding a spin-dependent scattering of electrons in a conventional type B of spin valve element.

FIG. 9(A) and FIG. 9(B) show a state that of the free magnetic layer 2, the non-magnetic metal layer 3 and the fixed magnetic layer 4, shown in FIG. 4(A) and FIG. 4(B), the free magnetic layer 2 is replaced by a laminated ferrimagnetic film of the conventional type B of spin valve element, which consists of a first free magnetic layer 2_1, an opposite-parallel-coupling intermediate layer 2_2 and a second free magnetic layer 12_3, in the order from the side near the non-magnetic metal layer 3. Here, there is considered such a case that a thickness in layer of the first free magnetic layer 2_1 is thicker than that of the second free magnetic layer 12_3. As shown in FIG. 9(A), in the event that the external magnetic field points upward, a direction m2_1 of magnetization of the first free magnetic layer 2_1 points upward, and a direction m12_3 of magnetization of the second free magnetic layer 12_3 points downward opposite to the direction m2_1 of magnetization of the first free magnetic layer 2_1 owing to the opposite-parallel-coupling intermediate layer 2_2. And as shown in FIG. 9(B), in the event that the external magnetic field points downward, reversely, a direction m2_' of magnetization of the free magnetic layer 2_1 points downward and a direction m12_3' of magnetization of the second free magnetic layer 12_3 points upward. Further, as shown in FIG. 9(A) and FIG. 9(B), a direction m4 of magnetization of the first fixed magnetic layer 4 always points upward independently of a direction of the external magnetic field.

In the state shown in FIG. 9(A), electron e4 of a spin directed upward, which is represented by a white circle involving an arrow in the fixed magnetic layer 4, is not subjected to inelastic scattering when it enters the first free magnetic layer 2_1. However, when the electron e4 enters the second fixed magnetic layer 12_3, it is subjected to inelastic scattering. In the state shown in FIG. 9(B), electron e4 of a spin directed upward, which is represented by a white circle involving an arrow in the fixed magnetic layer 4, is subjected to inelastic scattering when it enters the first free magnetic layer 2_1. However, when the electron e4 enters the second free magnetic layer 12_3, it is not subjected to inelastic scattering. In the state shown in FIG. 9(A), the direction m4 of magnetization of the fixed magnetic layer 4 and the direction m2_1 of magnetization of the first free magnetic layer 2_1 near the fixed magnetic layer 4 point the same direction. Accordingly, a resistance of the spin valve element is small in its entirety. On the other hand, in the state shown in FIG. 9(B), the direction m4 of magnetization of the fixed magnetic layer 4 and the direction m2_1' of magnetization of the first free magnetic layer 2_1 point mutually opposite directions. Accordingly, a resistance of the spin valve element is large in its entirety. That is, in the event that the portion of the free magnetic layer is formed with a laminated ferrimagnetic film, a resistance of the spin valve element in its entirety due to the direction of the external magnetic field has a tendency of variations in a similar fashion to that of the resistance of the conventional spin valve element having the simple structure of which the state is shown in FIG. 4. However, in the event that the portion of the free magnetic layer is formed with a laminated ferrimagnetic film, the directions m12_3 and m12_3' of magnetization of the second free magnetic layer 12_3 and the directions m2_1 and m2_1' of magnetization of the first free magnetic layer 2_1 point always mutually opposite directions. Accordingly, with respect to variations in resistance by the magnetoresistive effect, the existence of the second free magnetic layer 12_3 brings about an opposite effect to the first free magnetic layer 2_1, so that the magnetoresistive effect of the spin valve element is weakened and the MR ratio is reduced.

In states of FIG. 9(A) and FIG. 9(B), an electron e12_3 of a spin directed downward in the second free magnetic layer 12_3 and an electron e12_3' of a spin directed upward are easy to be subjected to the inelastic scattering when they enter the first free magnetic layer 2_1, and as a result of the inelastic scattering, the spin valve element increase in resistivity by a predetermined resistance increment independently of a direction of the external magnetic field H. Thus, the increment of the resistivity also serves to reduce MR ratio.

However, according to the SVMR head 20 of the above-mentioned second embodiment, since a high resistive material is used for the second free magnetic layer 2_3, as will be described hereinafter, MR ratio is increased as compared with the SVMR head having the conventional type B of spin valve element.

Figure 10:
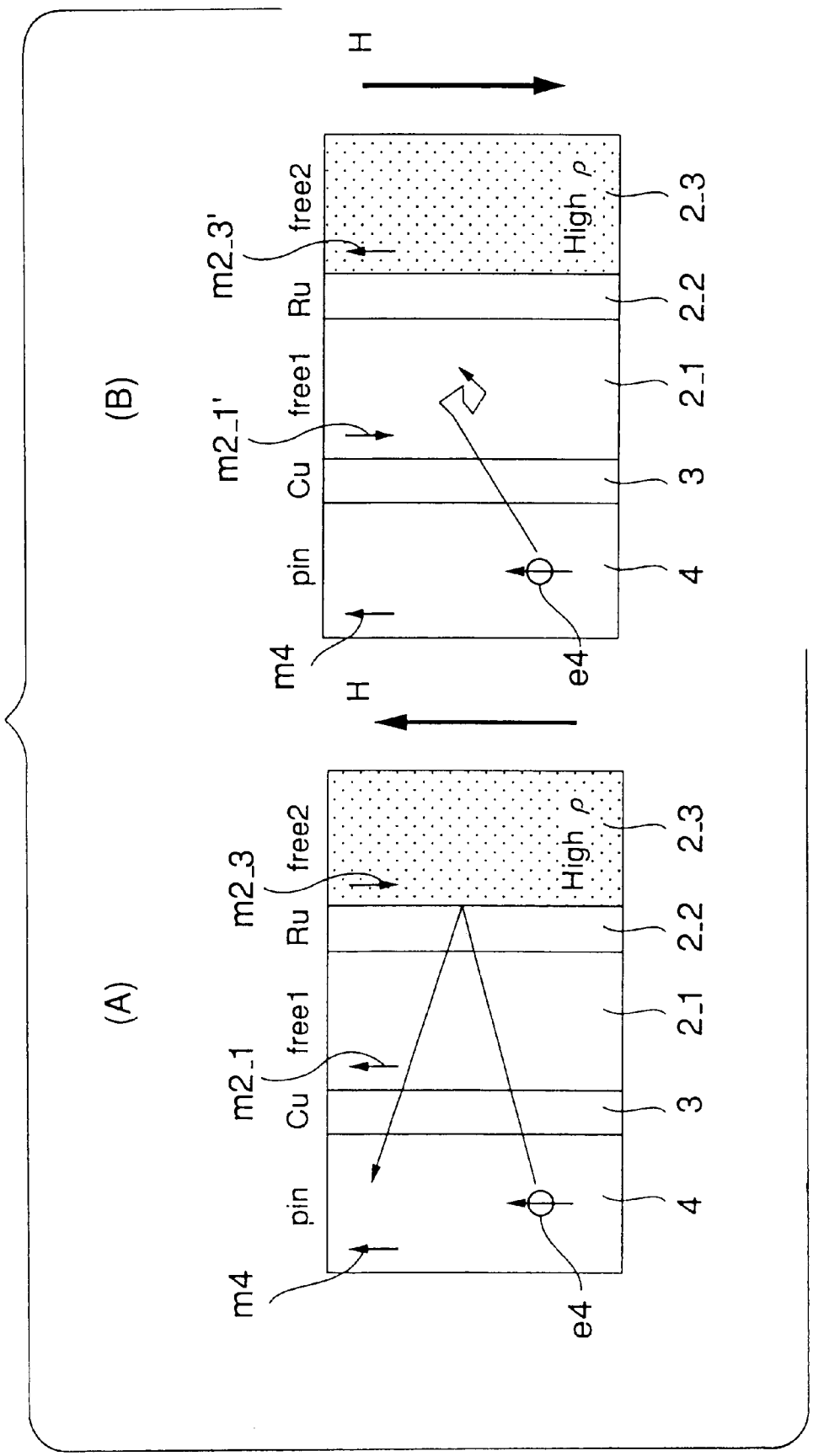
FIG. 10 is a typical illustration useful for understanding a state of a spin-dependent scattering of a spin valve element in an SVMR head 20 of a second embodiment.

FIG. 10 is a typical illustration useful for understanding a state of a spin-dependent scattering of a spin valve element in an SVMR head 20 of a second embodiment.

FIG. 10(A) and FIG. 10(B) show a state that the second free magnetic layer 12_3 shown in FIG. 9(A) and FIG. 9(B) is replaced by the second free magnetic layer 2_3 having a high resistance. Magnetization of the respective layer points the same direction as the magnetization of the associated layer in FIG. 9.

In a state shown in FIG. 10(A), an electron e4 of a spin directed upward, which is represented by a white circle involving an arrow in the fixed magnetic layer 4, is hard to enter the second free magnetic layer 2_3 even if it passes through the first free magnetic layer 2_1. Thus, the electron e4 is subjected to an elastic scattering within an opposite-parallel-coupling intermediate layer 2_2, within a second free magnetic layer 2_3, and/or at the interface between the opposite-parallel-coupling intermediate layer 2_2 and the second free magnetic layer 2_3, so that the electron e2 may return to the first free magnetic layer 2_1. When the electron is subjected to the elastic scattering, a probability that the electron is subjected to the inelastic scattering is greatly reduced as compared with the state shown in FIG. 9(A). Accordingly, a resistance of the spin valve element is small in its entirety. On the other hand, in the state shown in FIG. 10(B), electron e4 of a spin directed upward, which is represented by a white circle involving an arrow in the fixed magnetic layer 4, is easy to be subjected to inelastic scattering in the first free magnetic layer 2_1. However, even if the electrons e4 pass through first free magnetic layer 2_1 without being subjected to inelastic scattering in the first free magnetic layer 2_1, almost of all the electrons e4 do not enter the second free magnetic layer 2_3, and are subjected to elastic scattering in a similar fashion to that of the state shown in FIG. 10(A), so that the electrons return to the first free magnetic layer 2_1 in which the electrons are easy to be subjected to inelastic scattering. Thus, in the state shown in FIG. 10(B), a probability that the electron is subjected to the inelastic scattering is increased as compared with the state shown in FIG. 9(B). Accordingly, a resistance of the spin valve element is incremented in its entirety. In this manner, since almost of all the electrons do not enter the second free magnetic layer 2_3 of high resistance, the resistive variation, which will occur in accordance with a change of a direction of the external magnetic field, is increased. Accordingly, the SVMR head 20 of the second embodiment has a larger MR ratio as compared with the conventional SVMR head using a laminated ferrimagnetic film on the portion of the free magnetic layer. An adoption of the second free magnetic layer 2_3 consisting of a material of a high resistance makes it hard that a sense current conducts the second free magnetic layer 2_3, but the sense current effectively conducts through the free magnetic layer 2_1, the non-magnetic metal layer 3 and the fixed magnetic layer 4, which are directly associated with the magnetoresistive effect, of the spin valve element. The fact that the sense current effectively conducts through the portions, which are directly associated with the magnetoresistive effect, of the spin valve element, also makes it possible to enhance the MR ratio of the SVMR head 20.

In a similar fashion to that of the second fixed magnetic layer 4_3 in the SVMR head 10, it is preferable that the second free magnetic layer 2_3 in the SVMR head 20 has a resistivity not less than 200 $\mu\Omega$ cm, which is generally larger than a resistivity of the antiferromagnetic layer 5. Further, in the SVMR head 20, it is more preferable that a resistivity of the second free magnetic layer 2_3 is higher, since it is hard that the sense current conducts through the second free magnetic layer 2_3.

<Magnetoresistive Effect Type of Head of the Third Embodiment>

A magnetoresistive effect type of head of the third embodiment has a compound spin valve element of type A and type B.

Figure 11:
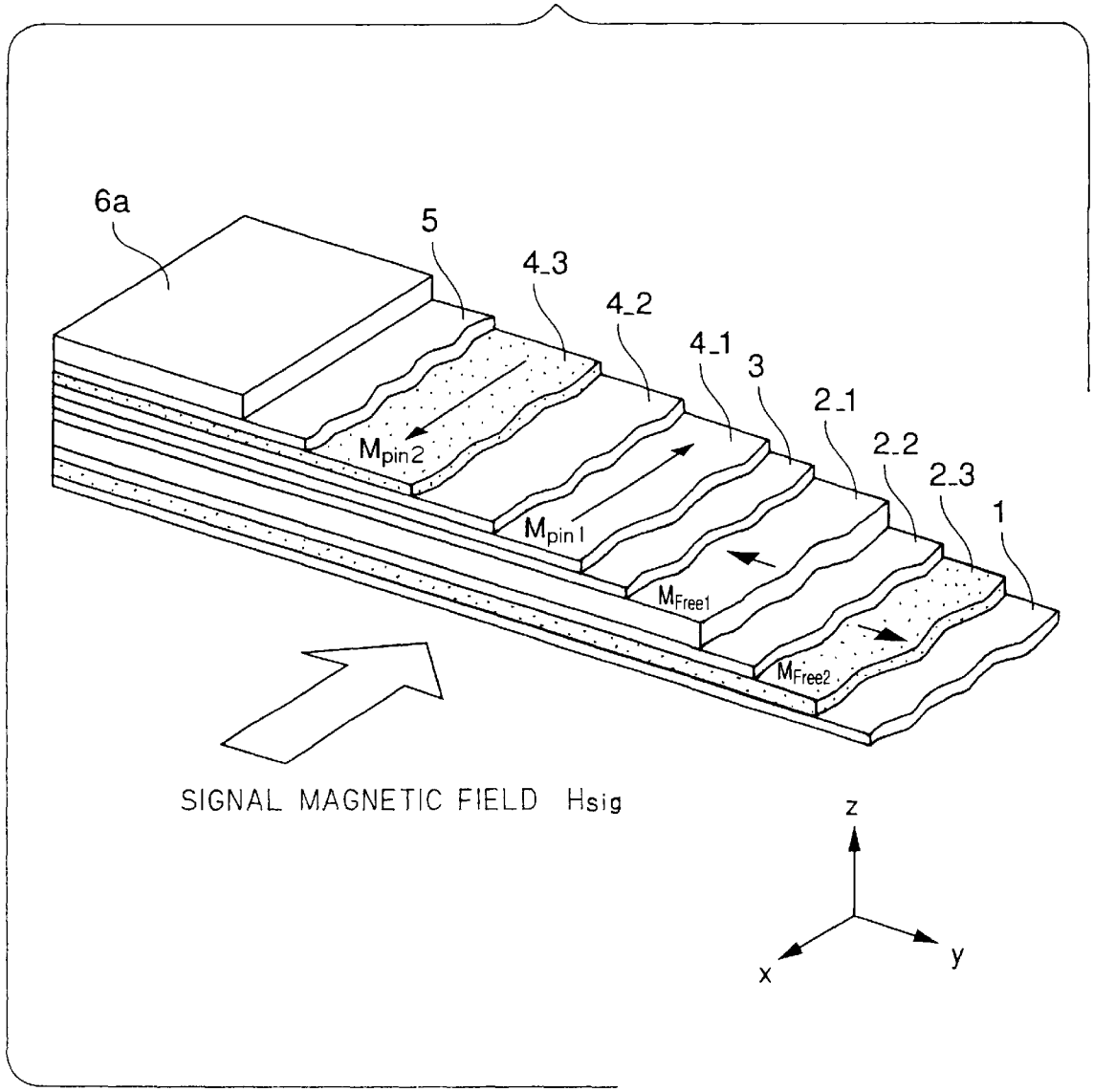
FIG. 11 is a perspective view of an essential part of a compound spin valve element of type A and type B, of a magnetoresistive effect type of head of a third embodiment.

FIG. 11 is a perspective view of an essential part of a compound spin valve element of type A and type B, of a magnetoresistive effect type of head of the third embodiment.

In an SVMR head 30 shown in FIG. 11, the fixed magnetic layer 4 in the conventional SVMR head 100 having the simple structure is replaced by a laminated ferrimagnetic film consisting of a first fixed magnetic layer 4_1/an opposite-parallel-coupling intermediate layer 4_2/a second fixed magnetic layer 4_3 as shown in the SVMR head 10, and the free magnetic layer 2 in the conventional SVMR head 100 is replace by a laminated ferrimagnetic film consisting of a first free magnetic layer 2_1/an opposite-parallel-coupling intermediate layer 2_2/a second free magnetic layer 2_3 as shown in the SVMR head 20.

According to the compound spin valve element of type A and type B as shown in FIG. 11, a high resistance of material is used for the second free magnetic layer 2_3 and the second fixed magnetic layer 4_3. Electrons are subjected to elastic scattering by both those layers so that the electrons are locked between those layers. Thus, it is possible to derive the maximum resistance variation by the spin-dependence scattering of electrons. In a similar fashion to that of the second fixed magnetic layer 4_3 of the spin valve element of type A and the second free magnetic layer 2_3 of spin valve element of type B, it is preferable that each of both those layers has a resistivity not less than 200 $\mu\Omega$ cm.

According to the SVMR head 30, there are adopted the spin valve element in which the laminated ferrimagnetic films are used for both the portion of the free magnetic layer and the portion of the fixed magnetic layer. The SVMR head 30 has both advantages of the SVMR head 10 and the SVMR head 20, and is excellent in output and sensitivity.

Hereinafter, there will be explained an example of a method of manufacturing the SVMR head 30 in conjunction with FIG. 11. On a substrate consisting of an alumina titanium carbide (Al$_2$ O$_3$-Tic), a primary layer 1 (thickness 30 Å) consisting of Ta is formed, a second free magnetic layer 2_3 (30 Å) consisting of Fe—Al—O is formed on the primary layer 1, an opposite-parallel-coupling intermediate layer 2_2 (8 Å) consisting of Ru is formed on the second free magnetic layer 2_3, a first free magnetic layer 2_1 (30 Å) consisting of CoFeB is formed on the opposite-parallel-coupling intermediate layer 2_2, a nonmagnetic metal layer 3 (30 Å) consisting of Cu is formed on the first free magnetic layer 2_1, a first fixed magnetic layer 4_1 (20 Å) consisting of CoFeB is formed on the nonmagnetic metal layer 3, an opposite-parallel-coupling intermediate layer 4_2 (8 Å) consisting of Ru is formed on the first fixed magnetic layer 4_1, a second fixed magnetic layer 4_3 (30 Å) consisting of Me—Fe—O is formed on the opposite-parallel-coupling intermediate layer 4_2, using transition metallic compound Me such as MnZn, NiZn, MnCoZn, a layer (500 Å) consisting of NiO or a layer (150 Å) consisting of PdPtMn is formed on the second fixed magnetic layer 4_3 in form of an antiferromagnetic layer 5. And in the event that the layer consisting of PdPtMn is used for the antiferromagnetic layer 5, a protection layer (100 Å) not illustrated consisting of Ta is formed on the antiferromagnetic layer 5. Those layers are continuously formed by means of spattering and the like. At that time, it is acceptable that a conductive mirror reflection film, for example, a film (5 Å) consisting of Au and a film (5 Å) consisting of Ag, or an insulating property of mirror reflection film, for example, Ta—O and non-magnetic Co—Fe—O is inserted between the primary layer 1 and the free magnetic layer 2.

The multi-layer film thus formed becomes a spin valve element subjected to patterning to a shape of an element by a lithography technology, and a hard magnetic layer for applying a bias to the terminal electrode and the free magnetic layer is formed on the spin valve element.

<Magnetoresistive Effect Type of Head of the Fourth Embodiment>

A magnetoresistive effect type of head of the fourth embodiment has a spin valve element of type C.

Figure 12:
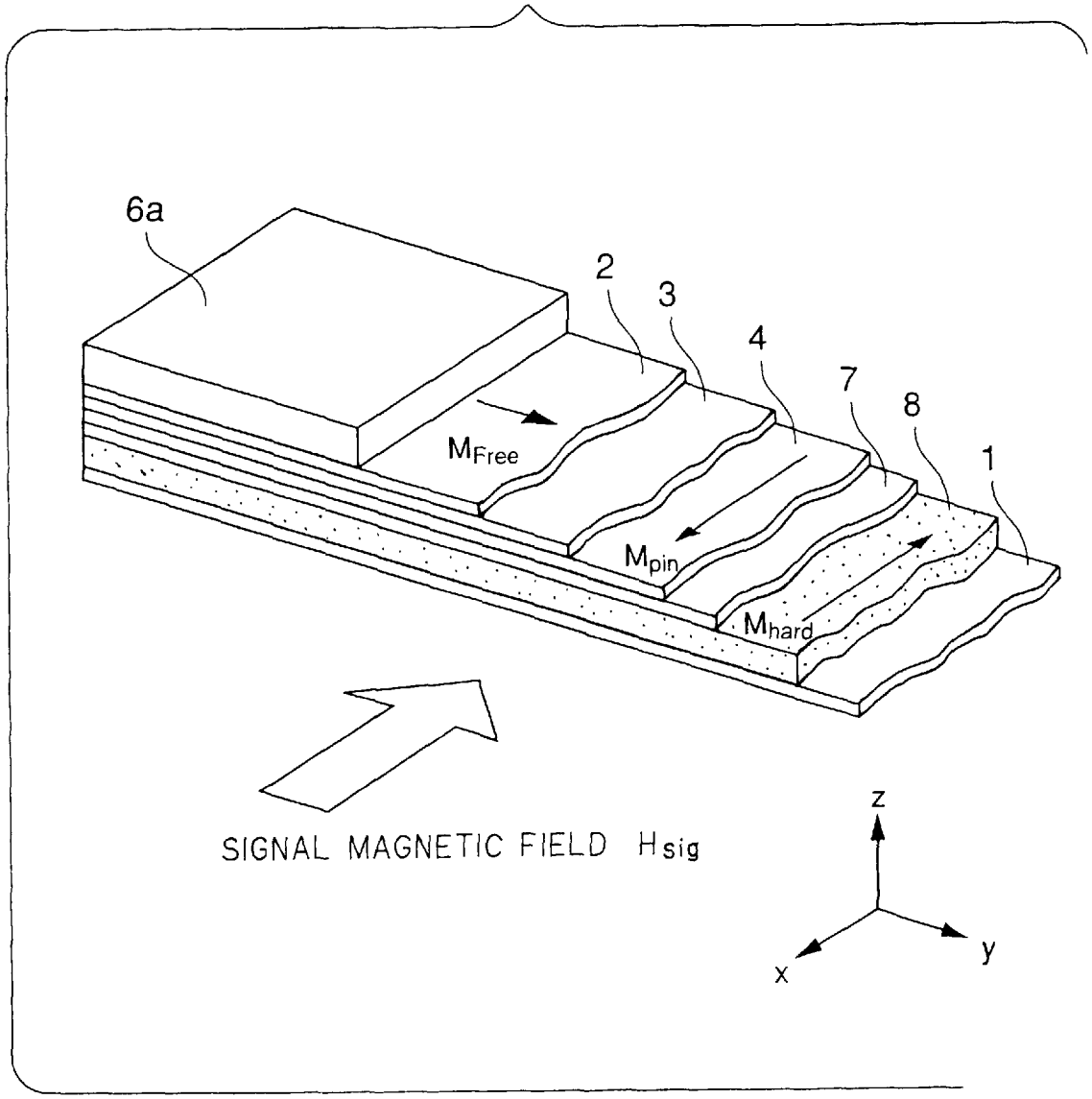
FIG. 12 is a perspective view of an essential part of a compound spin valve element of type C, of a magnetoresistive effect type of head of a fourth embodiment.

FIG. 12 is a perspective view of an essential part of a compound spin valve element of type C, of a magnetoresistive effect type of head of a fourth embodiment.

An SVMR head 40 shown in FIG. 12 has a spin valve element using, as pinning means of magnetization of a fixed magnetic layer, a laminated ferrimagnetic film consisting of a fixed magnetic layer 4/an opposite-parallel-coupling intermediate layer 7/a hard magnetic layer 8. In this spin valve element, the hard magnetic layer 8 consists of a hard magnetic material and serves both as the second fixed magnetic layer 4_3 and the antiferromagnetic layer 5 in the spin valve element of type A. In the SVMR head of the first embodiment, when the second fixed magnetic layer 4_3 is formed with a high resistance of material, the MR ratio is improved. In a similar fashion to this, when the hard magnetic layer 8 is formed with a high resistance of material having a higher resistivity than the fixed magnetic layer 4, the MR ratio of the spin valve is improved. In a similar fashion to that of the second fixed magnetic layer 4_3 and the second free magnetic layer 2_3, it is preferable that the hard magnetic layer 8 has a resistivity not less than 200 $\mu\Omega$ cm. Further, it is preferable that the hard magnetic layer 8 consists of a material having a coercive force not less than 600Oe.

Hereinafter, there will be explained an example of a method of manufacturing the SVMR head 40 in conjunction with FIG. 12. On a substrate consisting of an alumina titanium carbide (Al$_2$ O$_3$-Tic), a primary layer 1 (thickness 30 Å) consisting of Cr is formed, a hard magnetic layer 7 (100 Å) consisting of Co—Fe—O is formed on the primary layer 1, an opposite-parallel-coupling intermediate layer 8 (8 Å) consisting of Ru is formed on the hard magnetic layer 7, a fixed magnetic layer 4 (30 Å) consisting of CoFeB is formed on the opposite-parallel-coupling intermediate layer 8, a non-magnetic metal layer 3 (30 Å) consisting of Cu is formed on the fixed magnetic layer 4, a two-layer film, as the free magnetic layer 2, consisting of a layer 15 Å) consisting of CoFeB and a layer (20 Å) consisting of NiFe laminated on the layer consisting of CoFeB is formed on the non-magnetic metal layer 3, and a protection layer 100 Å) not illustrated consisting of Ta is formed on the free magnetic layer 2. Those layers are continuously formed by means of spattering and the like. At that time, as the free magnetic layer 2, it is acceptable that a laminated ferrimagnetic layer of CoFeB 25 Å)/Ru (8 Å)/Fe—Al—O (30 Å) is formed. Further, it is acceptable that a conductive mirror reflection film, for example, a film (5 Å) consisting of Au and a film (5 Å) consisting of Ag, or an insulating property of mirror reflection film, for example, Ta—O and non-magnetic Co—Fe—O is inserted between the primary layer 1 and the free magnetic layer 2. The multi-layer film thus formed becomes a spin valve element subjected to patterning to a shape of an element by a lithography technology, and a hard magnetic layer for applying a bias to the terminal electrode and the free magnetic layer is formed on the spin valve element.

In any of the SVMR heads of the embodiments as mentioned above, it is acceptable that CoFeB used in the fixed magnetic layer and the free magnetic layer is replaced by Co alloy such as Co, CoFe, and further it is acceptable that PdPtMn, NiO used in the antiferromagnetic layer 5 are replaced by PtMn, PdMn, NiMn, IrMn. As replacement for Fe—Al—O, it is possible to use a soft magnetic material consisting of an oxide, a nitride, a carbide and a boride, which is mainly composed of Fe.

A film using an ordered alloy such as PdPtMn for the antiferromagnetic layer 5 is subjected to an ordering heat treatment in the magnetic field, after formation of the film. The ordering heat treatment is not always necessary in the event that disordering based NiO and IrMn are used for the antiferromagnetic layer 5. Usually, the ordering heat treatment is performed at 280° C. or more. However, according to the SVMR head of the present embodiment, in the event that the fixed magnetic layer is formed with the laminated ferrimagnetic film, magnetization of the fixed magnetic layer is strongly fixed by the laminated ferrimagnetic film. Thus, according to the SVMR head of the present embodiment, the ordering heat treatment is performed at the lower temperature, for example, 250° C. or so. In this manner, when the ordering heat treatment is performed at the lower temperature, for example, an interface between the second fixed magnetic layer 4_3 and the opposite-parallel-coupling intermediate layer 4_2 is smoothed, so that electrons are easy to be subjected to elastic scattering at the interface. In this manner, when the interface between the second fixed magnetic layer 4_3 and the opposite-parallel-coupling intermediate layer 4_2 is smoothed, and the interface between the second free magnetic layer 2_3 and the opposite-parallel-coupling intermediate layer 2_2, and the interface between the hard magnetic layer 8 and the opposite-parallel-coupling intermediate layer 7 are smoothed, so that a probability that electrons are subjected to elastic scattering at the interface, it is also possible to improve MR ratio of the spin valve element.

Even if a sense current through the antiferromagnetic layer 5, it does not contribute to the magnetoresistive effect. Thus, it is preferable that the antiferromagnetic layer 5 consists of a high resistance of material such as nickel oxide so that a mirror reflectivity at the interface between the antiferromagnetic layer 5 and the fixed magnetic layer is enhanced and the sense current effectively conducts through the fixed magnetic layer, a non-magnetic metal layer and the free magnetic layer.

It is also preferable for improvement of the MR ratio that a high resistance of material is inserted between the free magnetic layer and the primary layer in case of type A, and between the free magnetic layer and the terminal electrode in case of type C, and a high resistance of material is used for the primary layer of type A. Further, according to the present embodiment, Ru is mainly used for the opposite-parallel-coupling intermediate layer. It is preferable for improvement of the MR ratio that a high resistance of material replaces Ru.

It is preferable for improvement of the MR ratio that mirror reflectivity between the free magnetic layer and the primary layer or between the fixed magnetic layer and the antiferromagnetic layer is enhanced, by means of inserting a film having high mirror reflectivity, for example, a thin gold and a thin silver, between the free magnetic layer and the primary layer, and providing a thin oxidizing layer between the fixed magnetic layer and the antiferromagnetic layer.

What is claimed is:

1. A magnetoresistive effect type of head having a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said free magnetic layer has a first free magnetic layer, a second free magnetic layer laminated at a position farther from the fixed magnetic layer as compared with the first free magnetic layer, and an opposite-parallel-coupling intermediate layer interposed between the first free magnetic layer and the second free magnetic layer, in which magnetizations of the first and second free magnetic layers are coupled with one another in such a manner that the magnetizations are pointed in directions which are substantially parallel and mutually opposite, and said second free magnetic layer is formed with a metal oxide material which is different from a material of said first free magnetic layer, and with a material in which an electron in said first free magnetic layer is subjected to an elastic scattering within said second free magnetic layer, within said opposite-parallel-coupling intermediate layer, and/or at the interface between said second free magnetic layer and said opposite-parallel-coupling intermediate layer, said elastic scattering occurring at a higher rate as compared with a case where said second free magnetic layer is formed with a material which is the same as said first free magnetic layer.

2. A magnetoresistive effect type of head having a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said free magnetic layer has a first free magnetic layer, a second free magnetic layer laminated at a position farther from the fixed magnetic layer as compared with the first free magnetic layer, and an opposite-parallel-coupling intermediate layer interposed between the first free magnetic layer and the second free magnetic layer, in which magnetizations of the first and second free magnetic layers are coupled with one another in such a manner that the magnetizations are pointed in directions which are substantially parallel and mutually opposite, and said second free magnetic layer is formed with a metal oxide material which is different from a material of said first free magnetic layer, and has a resistivity higher than that of said first free magnetic layer.

3. An information-reproducing system, having a magnetic head for detecting magnetization of points in a magnetic storage medium storing information according to a direction of magnetization, said magnetic head being disposed close to or contacting with the magnetic storage medium, for reproducing information according to magnetization of points in the magnetic storage medium detected by said magnetic head, wherein said magnetic head has a magnetoresistive effect element offering a resistive change according to intensity of an external magnetic field, for detecting a magnitude of a resistance of the magnetoresistive effect element to detect intensity of a magnetic field, said magnetoresistive effect element consisting of a multi-layer film including a free magnetic layer varying in a direction of a magnetization in accordance with the external magnetic field and a fixed magnetic layer fixed in a direction of a magnetization, wherein said free magnetic layer has a first free magnetic layer, a second free magnetic layer laminated at a position farther from the fixed magnetic layer as compared with the first free magnetic layer, and an opposite-parallel-coupling intermediate layer interposed between the first free magnetic layer and the second free magnetic layer, in which magnetizations of the first and second free magnetic layers are coupled with one another in such a manner that the magnetizations are pointed in directions which are substantially parallel and mutually opposite, and said second free magnetic layer is formed with a metal oxide material which is different from a material of said first free magnetic layer, and with a material in which an electron in said first free magnetic layer is subjected to an elastic scattering within said second free magnetic layer, within said opposite-parallel-coupling intermediate layer, and/or at the interface between said second free magnetic layer and said opposite-parallel-coupling intermediate layer, said elastic scattering occurring at a higher rate as compared with a case where said second free magnetic layer is formed with a material which is the same as said first free magnetic layer.

* * * * *

UNITED STATES PATENT AND TRADEMARK OFFICE
CERTIFICATE OF CORRECTION

PATENT NO. : 6,671,138 B2
DATED : December 30, 2003
INVENTOR(S) : Noma et al.

It is certified that error appears in the above-identified patent and that said Letters Patent is hereby corrected as shown below:

<u>Title page, Item [54] and Column 1, line 1,</u>
Delete "MULTI-LAYER MAGNETORESISTIVE HEAD AND INFORMATION-REPRODUCING SYSTEM" and insert -- SPIN VALVE WITH DIFFERING MATERIAL ANTI-PARALLEL-COUPLED FREE LAYERS --.

Signed and Sealed this

Twenty-fifth Day of May, 2004

JON W. DUDAS
*Acting Director of the United States Patent and Trademark Office*